(12) United States Patent
Kitahara

(10) Patent No.: US 9,465,201 B2
(45) Date of Patent: Oct. 11, 2016

(54) IMAGING LENS AND IMAGING APPARATUS

(71) Applicant: FUJIFILM Corporation, Tokyo (JP)

(72) Inventor: Yu Kitahara, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 151 days.

(21) Appl. No.: 14/569,806

(22) Filed: Dec. 15, 2014

(65) Prior Publication Data

US 2015/0168692 A1    Jun. 18, 2015

(30) Foreign Application Priority Data

Dec. 17, 2013  (JP) .................................. 2013-260089

(51) Int. Cl.
 G02B 13/04    (2006.01)
 G02B 13/00    (2006.01)

(52) U.S. Cl.
 CPC ........... *G02B 13/04* (2013.01); *G02B 13/0045* (2013.01)

(58) Field of Classification Search
 CPC .................................................. G02B 13/0045
 USPC ....................................................... 359/713
 See application file for complete search history.

(56) References Cited

U.S. PATENT DOCUMENTS

| 7,995,291 B2 * | 8/2011 | Yamamoto | G02B 7/008 |
| | | | 359/713 |
| 8,040,618 B2 | 10/2011 | Kitahara | |
| 8,355,215 B2 | 1/2013 | Asami | |

FOREIGN PATENT DOCUMENTS

| JP | 11-142730 | 5/1999 |
| JP | 2009-216858 | 9/2009 |
| JP | 2010-107531 | 5/2010 |
| JP | 2011-237750 | 11/2011 |

OTHER PUBLICATIONS

DE Search Report dated Jul. 29, 2015, with English Translation; Application No. 10 2014 118 536.6.

* cited by examiner

*Primary Examiner* — Scott J Sugarman
(74) *Attorney, Agent, or Firm* — Young & Thompson

(57) ABSTRACT

An imaging lens substantially consists of negative first lens, positive second lens, negative third lens, positive fourth lens, positive fifth lens, and negative sixth lens in this order from an object side. At least one of second lens through sixth lens satisfies the following conditional expression (1), and the imaging lens, as a whole, satisfies the following conditional expression (2):

$(1/\tau i) \times (f/fi) < 0$  (1); and $\Sigma(1/\tau i) \times (f/fi) < 0$ ($i=1$ through 6)  (2).

15 Claims, 13 Drawing Sheets

EXAMPLE 1

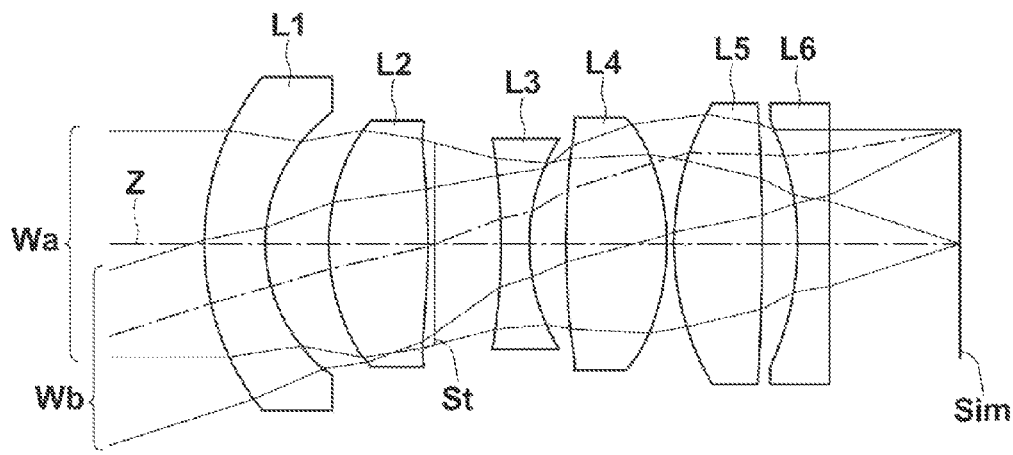
FIG.1 EXAMPLE 1
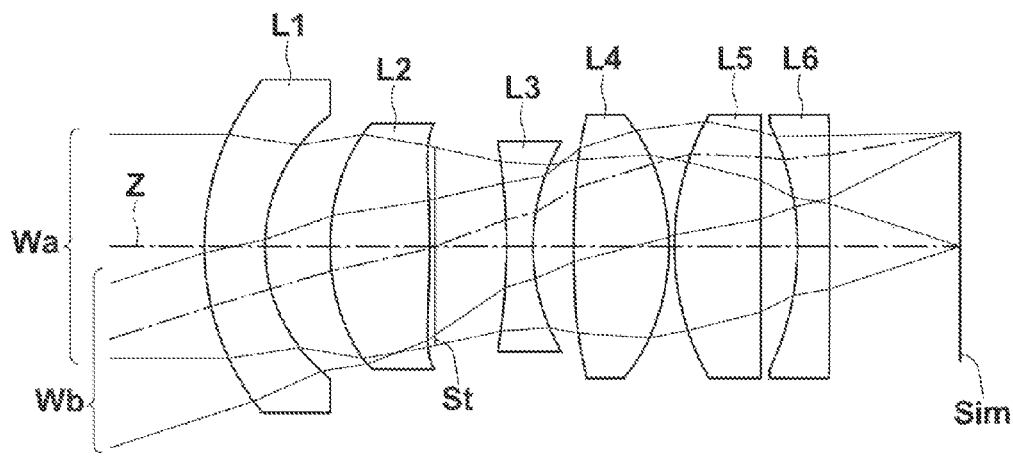
FIG.2 EXAMPLE 2

FIG.3  EXAMPLE 3
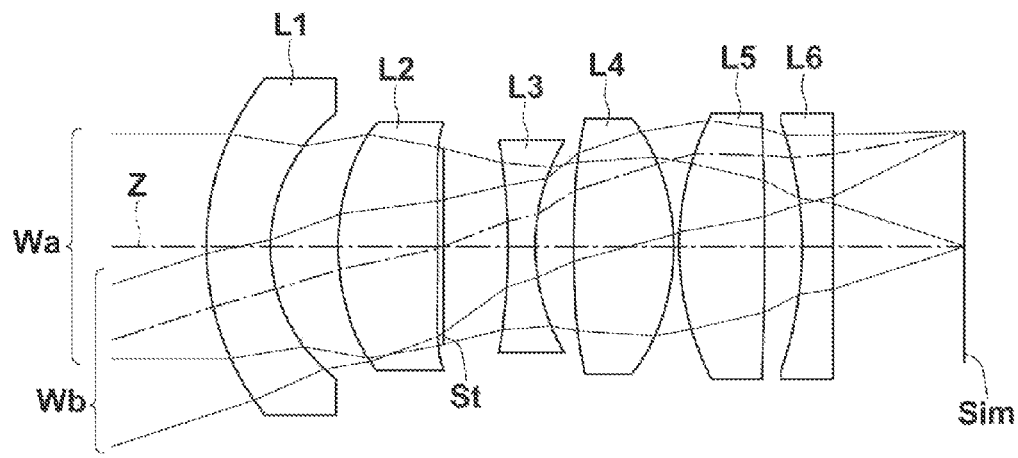
FIG.4  EXAMPLE 4
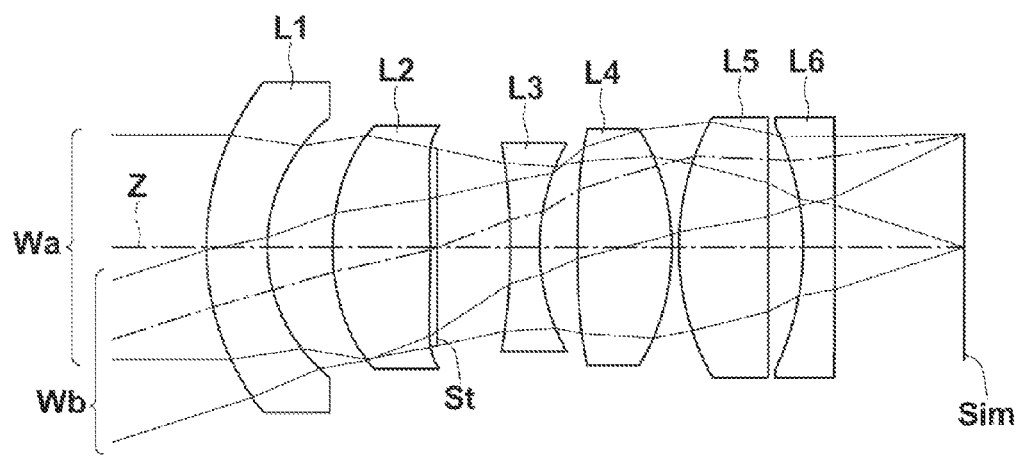

FIG.5  EXAMPLE 5
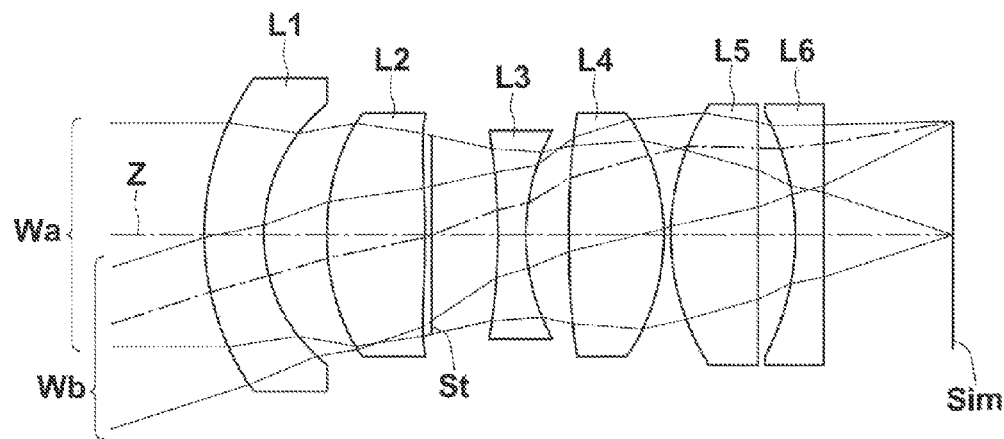
FIG.6  EXAMPLE 6
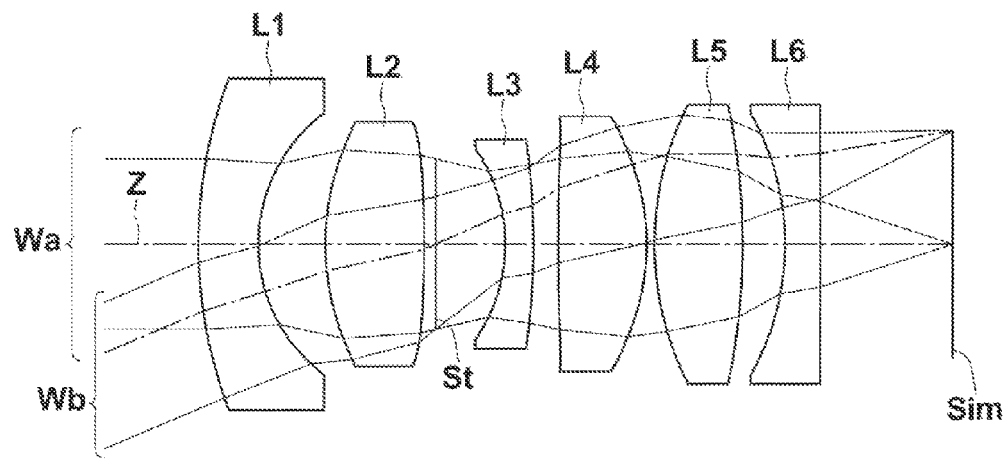

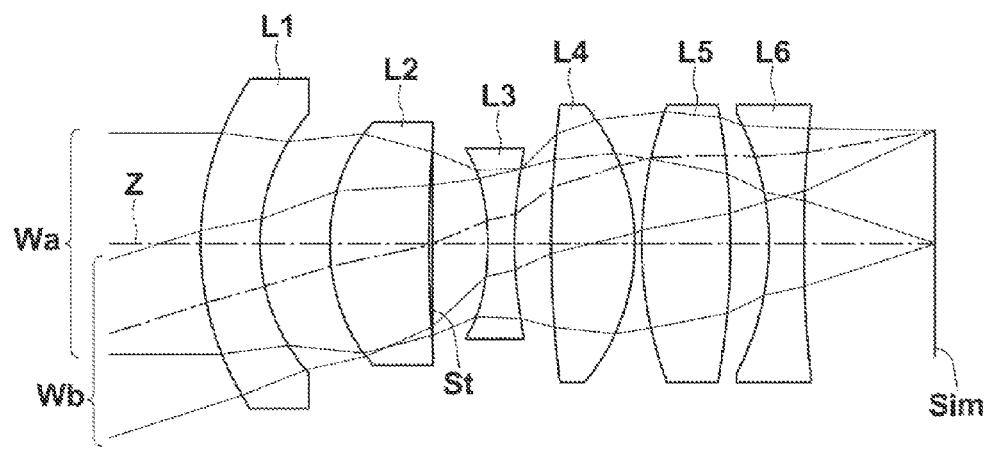
FIG.7  EXAMPLE 7
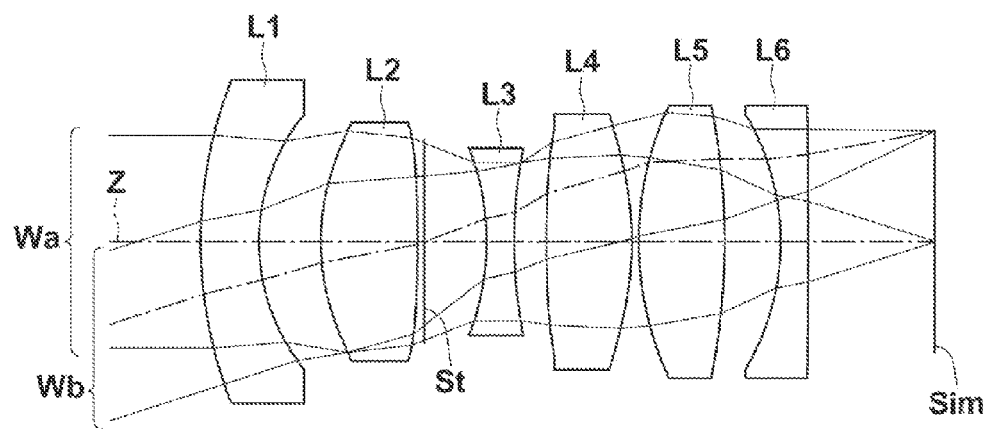
FIG.8  EXAMPLE 8

FIG.9    EXAMPLE 9
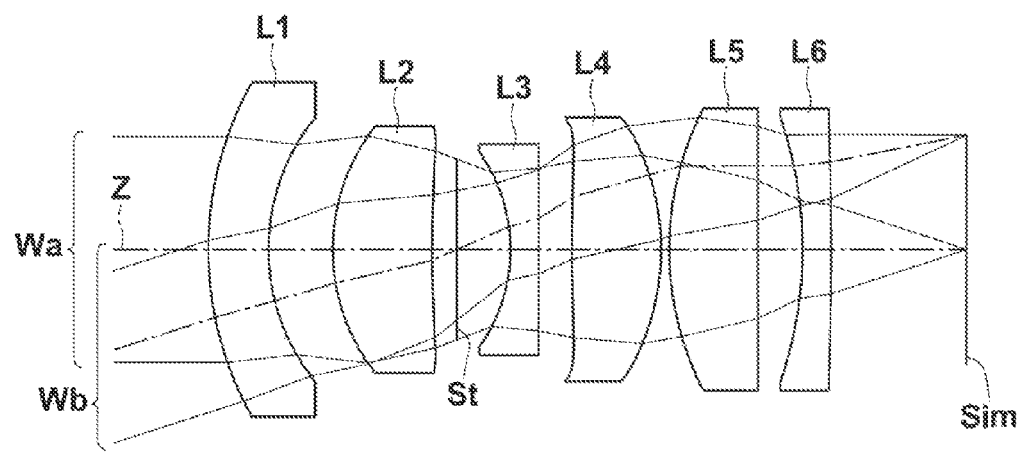
FIG.10    EXAMPLE 10
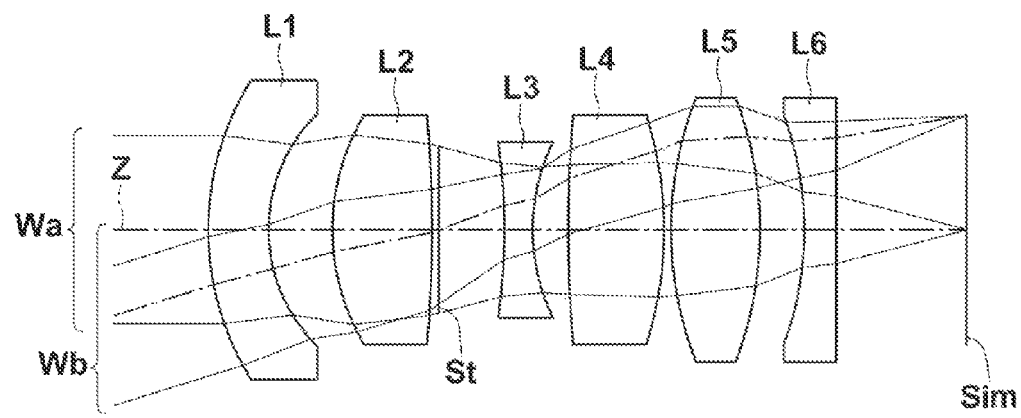

FIG.11  EXAMPLE 11
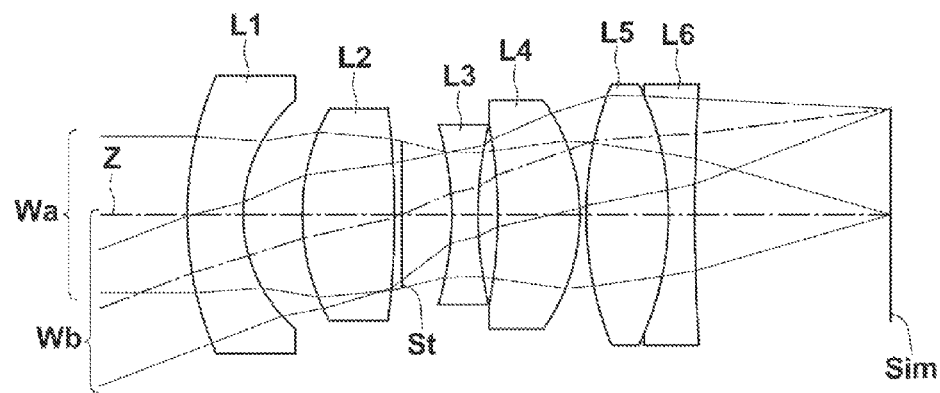
FIG.12  EXAMPLE 12
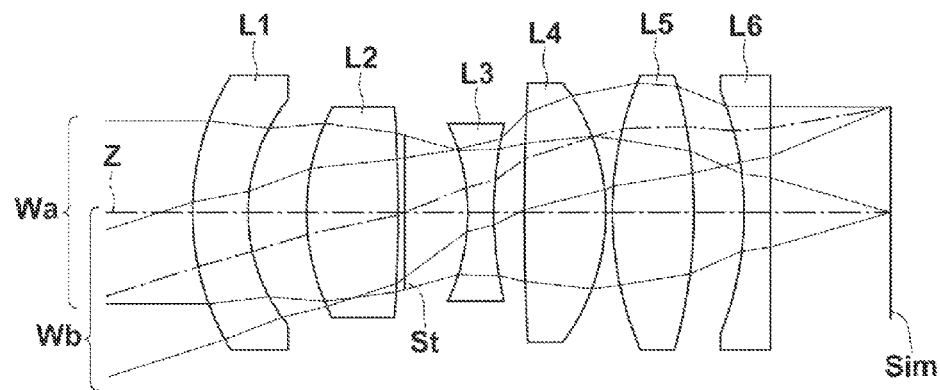

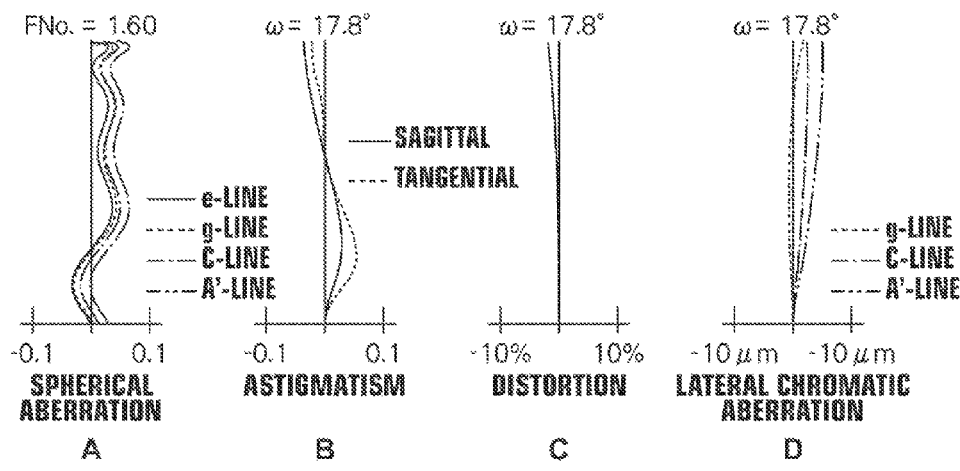
FIG.13 EXAMPLE 1
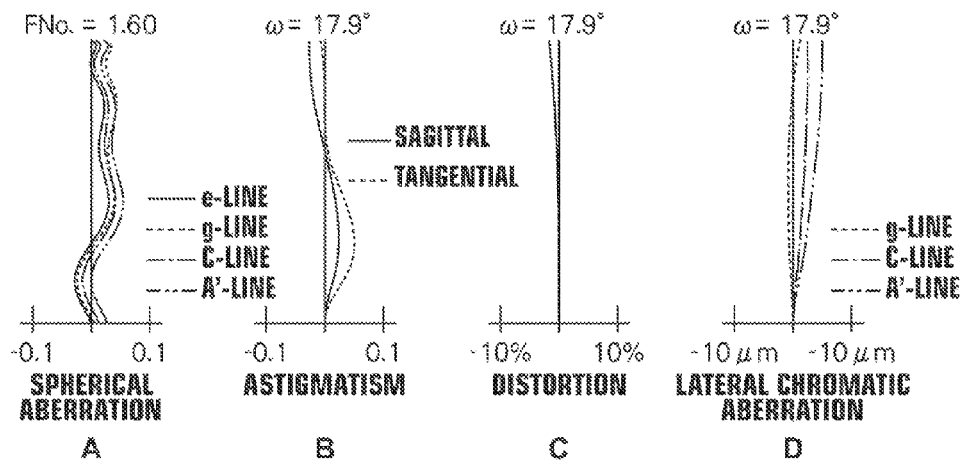
FIG.14 EXAMPLE 2

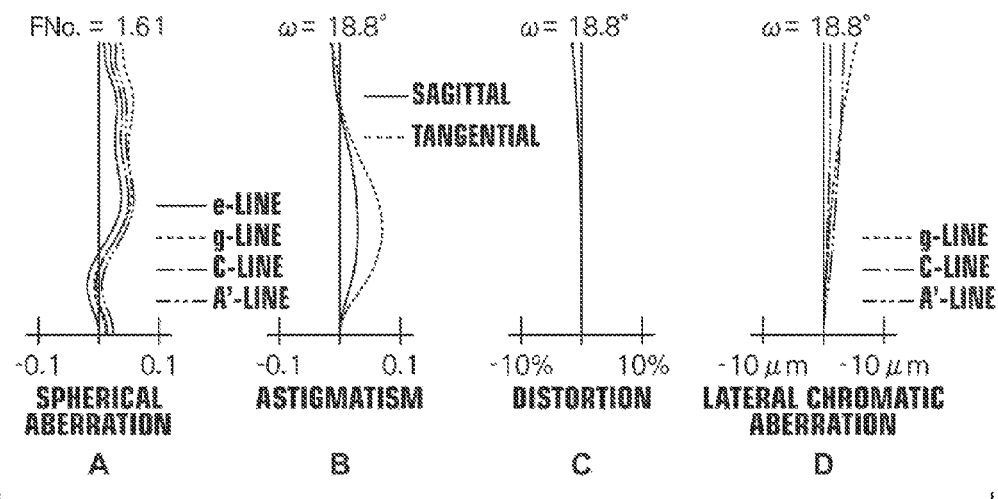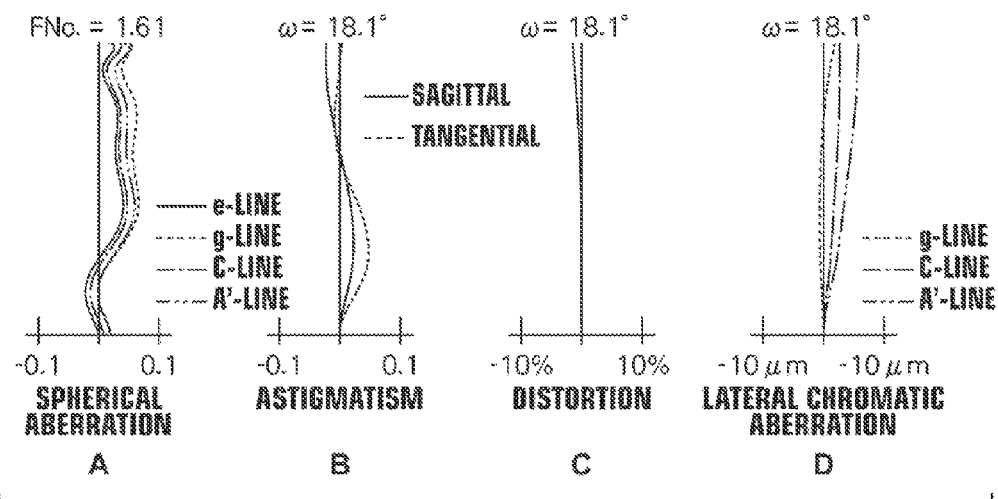

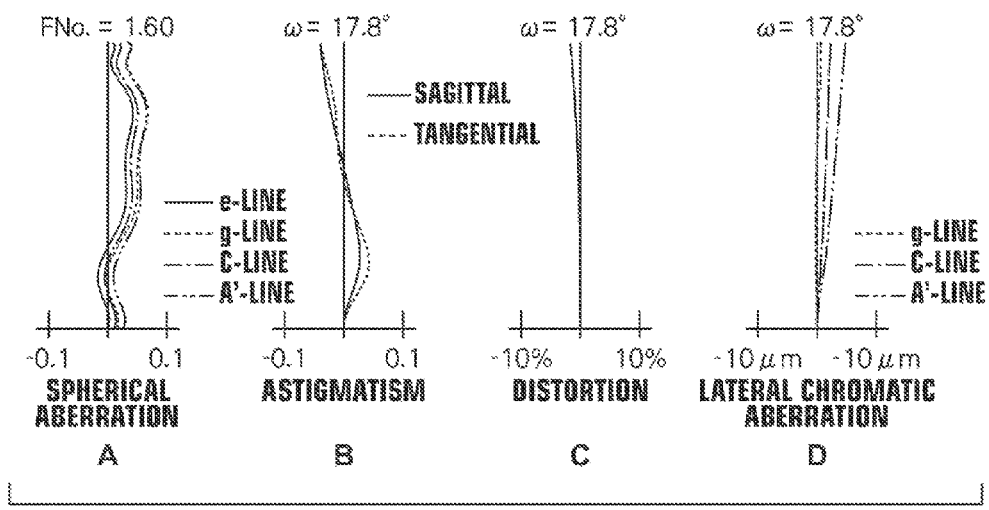
FIG.17  EXAMPLE 5
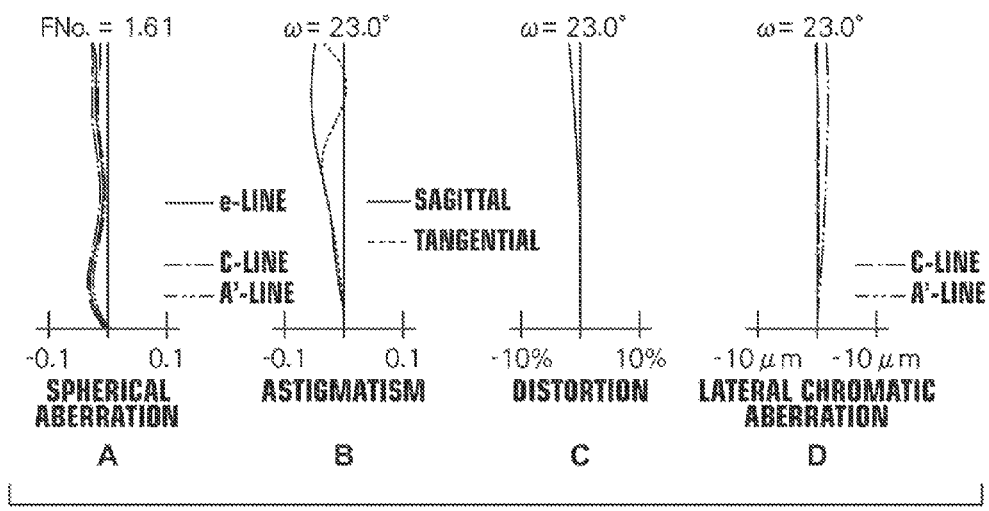
FIG.18  EXAMPLE 6

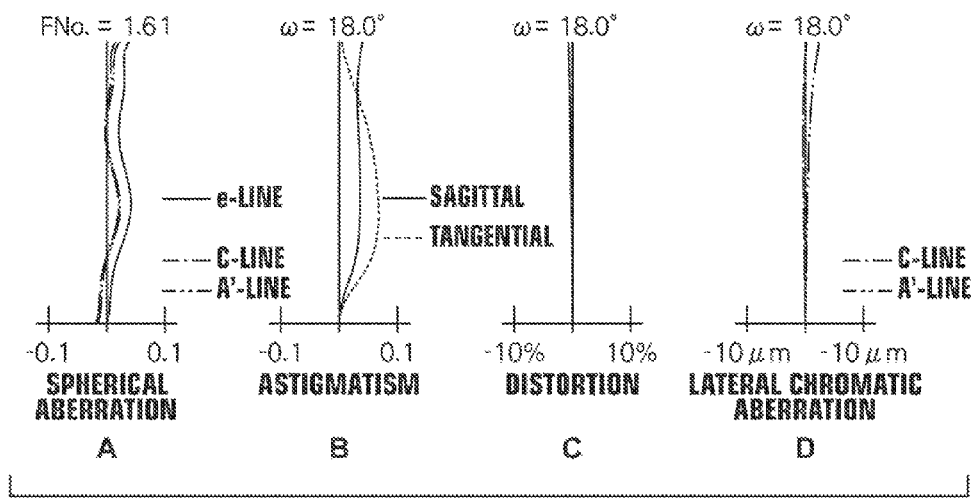
FIG.19 EXAMPLE 7
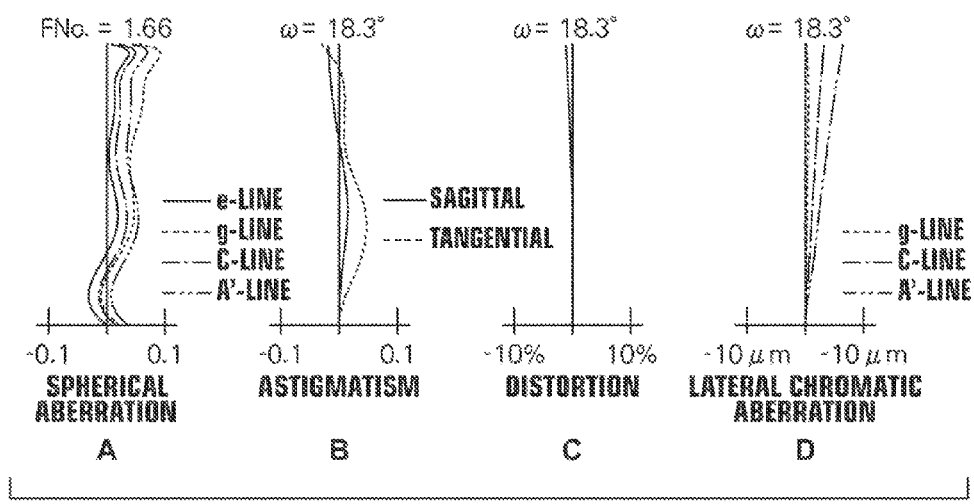
FIG.20 EXAMPLE 8

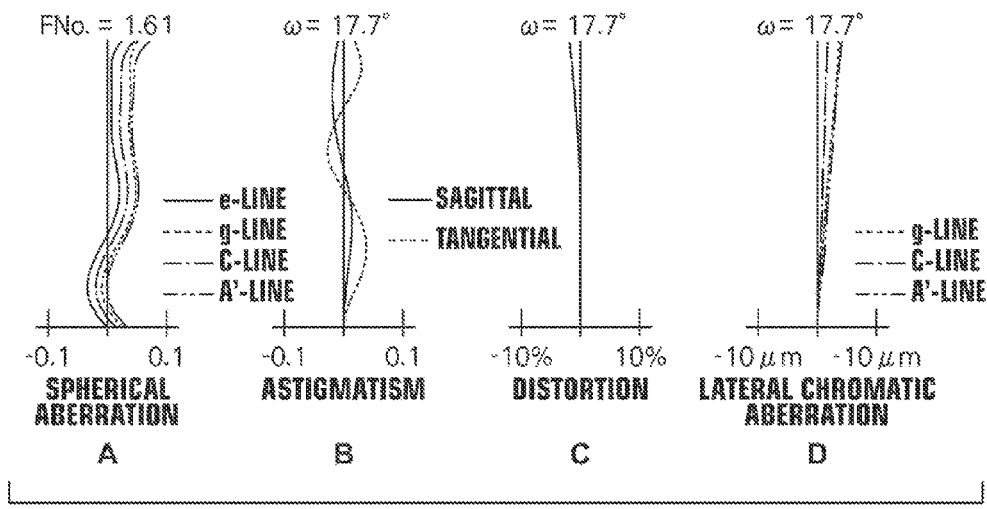
FIG.21 EXAMPLE 9
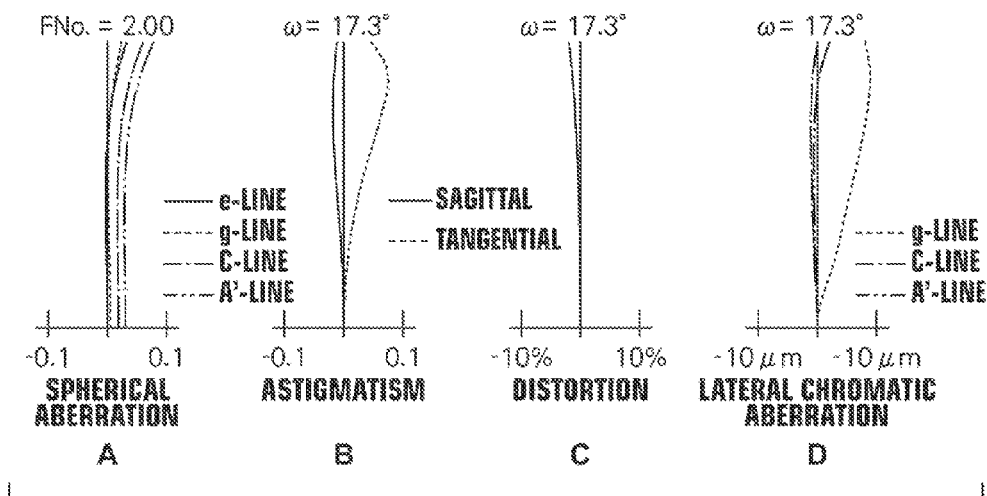
FIG.22 EXAMPLE 10

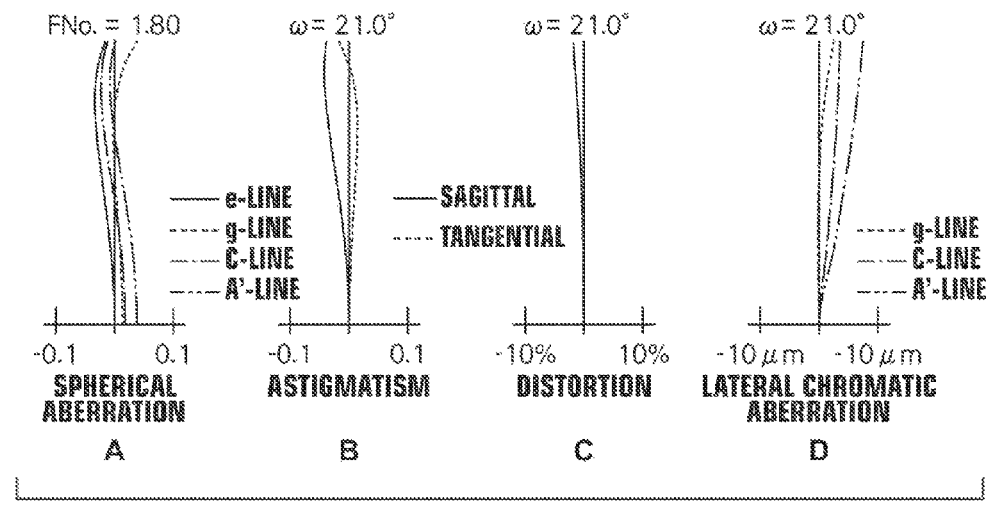
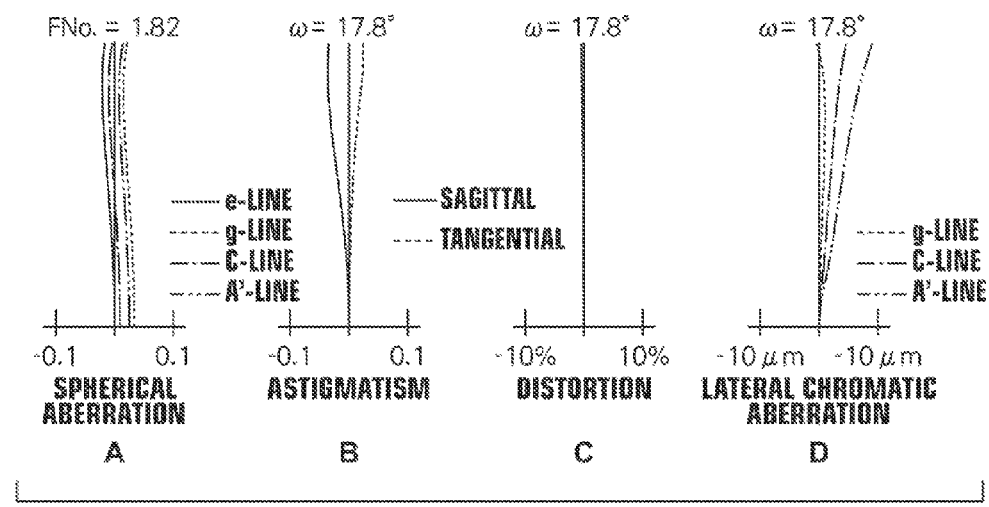

IMAGING LENS AND IMAGING APPARATUS

CROSS-REFERENCE TO RELATED APPLICATIONS

The present application claims priority under 35 U.S.C. §119 to Japanese Patent Application No. 2013-260089, filed on Dec. 17, 2013. The above application is hereby expressly incorporated by reference, in its entirety, into the present application.

BACKGROUND OF THE INVENTION

1. Field of the Invention

The present invention relates to an imaging lens especially appropriate for an on-vehicle camera, and an imaging apparatus including the imaging lens.

2. Description of the Related Art

As a compact imaging lens that has a long backfocus and is especially appropriate for an on-vehicle camera, an imaging lens consisting of a meniscus first lens having negative refractive power with its convex surface facing an object side, a second lens having positive refractive power, an aperture stop, a third lens having negative refractive power, a fourth lens having positive refractive power, a fifth lens having positive refractive power, and a sixth lens having negative refractive power in this order from the object side is known. Imaging lenses with such structure are disclosed in Japanese Unexamined Patent Publication No. 11(1999)-142730 (Patent Document 1), Japanese Unexamined Patent Publication No. 2009-216858 (Patent Document 2), Japanese Unexamined Patent Publication No. 2010-107531 (Patent Document 3), and Japanese Unexamined Patent Publication No. 2011-237750 (Patent Document 4).

SUMMARY OF THE INVENTION

However, the imaging lens disclosed in Patent Document 1 uses plastic, the properties of which greatly change by a change in temperature. Therefore, the imaging lens is usable in limited environment, compared with an imaging lens consisting of only material, such as glass, a change in the properties of which by a change in temperature is small.

Further, Patent Documents 2 through 4 describe performance only at normal temperature, and are silent about a means for suppressing a fluctuation of a focus position during temperature change.

In view of the foregoing circumstances, it is an object of the present invention to provide an imaging lens that has excellent performance at normal temperature and also at high temperature, and a change in the focus position of which is small when temperature changes, and also an imaging apparatus including the imaging lens.

An imaging lens of the present invention substantially consists of a first lens having negative refractive power, a second lens having positive refractive power, a third lens having negative refractive power, a fourth lens having positive refractive power, a fifth lens having positive refractive power, and a sixth lens having negative refractive power in this order from an object side. Further, at least one of the second lens through the sixth lens satisfies the following conditional expression (1), and the imaging lens, as a whole, satisfies the following conditional expression (2):

$$(1/\tau i) \times (f/fi) < 0 \quad (1); \text{ and}$$

$$\Sigma(1/\tau i) \times (f/fi) < 0 \ (i=1 \text{ through } 6) \quad (2), \text{ where}$$

τi: a thermal Abbe number of an i-th lens,
f: a focal length of an entire system, and
fi: a focal length of the i-th lens.

Here, a relationship between a thermal Abbe number and a temperature coefficient of a refractive index is represented by the following equation (A):

$$1/\tau i = dni/dt/(ni-1) - \alpha i \quad (A), \text{ where}$$

dni/dt: a temperature coefficient of a refractive index of the i-th lens from 20 degrees to 40 degrees,
ni: a refractive index of the i-th lens for d-line, and
αi: a coefficient of linear expansion of the i-th lens.

In the imaging lens of the present invention, it is desirable that the first lens has a meniscus shape with its convex surface facing the object side.

It is desirable that the sixth lens has a concave surface facing the object side.

It is desirable that the fourth lens has a convex surface facing an image side.

It is desirable that the fifth lens has a convex surface facing the object side.

It is desirable that the second lens has a convex surface facing the object side.

It is desirable that the third lens has a concave surface facing the object side.

It is desirable that all of the first lens through the sixth lens are glass lenses.

It is desirable that at least one of the second lens through the sixth lens satisfies the following conditional expression (1-1). It is more desirable that the following conditional expression (1-2) is satisfied:

$$(1/\tau i) \times (f/fi) < -5e-6 \quad (1\text{-}1); \text{ and}$$

$$(1/\tau i) \times (f/fi) < -10e-6 \quad (1\text{-}2).$$

At this time, it is desirable that at least one of the second lens through the fifth lens satisfies conditional expression (1-1) and/or conditional expression (1-2).

Here, "e±n" represents a value by an exponent, and hereafter means the ±n-th power of 10, which is 10.

Further, it is desirable that the following conditional expression (2-1) is satisfied. It is more desirable that the following conditional expression (2-2) is satisfied:

$$\Sigma(1/\tau i) \times (f/fi) < -5e-6 \ (i=1 \text{ through } 6) \quad (2\text{-}1); \text{ and}$$

$$\Sigma(1/\tau i) \times (f/fi) < -10e-6 \ (i=1 \text{ through } 6) \quad (2\text{-}2).$$

An imaging apparatus of the present invention includes the aforementioned imaging lens of the present invention.

The phrase "substantially consists of" means that a lens or lenses substantially without refractive power, an optical element, such as a stop, a mask, a cover glass and a filter, other than the lenses, a mechanism part, such as a lens flange, a lens barrel, an imaging device and a hand shake blur correction mechanism, and the like may be included besides the lenses mentioned as composition elements.

Further, the surface shape of the lenses and the sign of refractive power are considered in a paraxial region when an aspherical surface is included.

The imaging lens of the present invention substantially consists of a first lens having negative refractive power, a second lens having positive refractive power, a third lens having negative refractive power, a fourth lens having positive refractive power, a fifth lens having positive refractive power, and a sixth lens having negative refractive power in this order from an object side. Further, at least one of the second lens through the sixth lens satisfies the following conditional expression (1), and the imaging lens, as a whole, satisfies the following conditional expression (2). Therefore, it is possible to provide the imaging lens that has excellent performance at normal temperature and also at high temperature, and a change in the focus position of which is small when temperature changes.

$$(1/\tau i) \times (f/fi) < 0 \qquad (1); \text{ and}$$

$$\Sigma(1/\tau i) \times (f/fi) < 0 \ (i=1 \text{ through } 6) \qquad (2).$$

Further, the imaging apparatus of the present invention includes the imaging lens of the present invention. Therefore, it is possible obtain video image with high image quality even if the imaging apparatus is used in environment where a change in temperature is large and the temperature tends to become high.

BRIEF DESCRIPTION OF THE DRAWINGS

FIG. 1 is a cross section illustrating the lens structure of an imaging lens according to an embodiment of the present invention (also Example 1):

FIG. 2 is a cross section illustrating the lens structure of an imaging lens in Example 2 of the present invention:

FIG. 3 is a cross section illustrating the lens structure of an imaging lens in Example 3 of the present invention;

FIG. 4 is a cross section illustrating the lens structure of an imaging lens in Example 4 of the present invention;

FIG. 5 is a cross section illustrating the lens structure of an imaging lens in Example 5 of the present invention;

FIG. 6 is a cross section illustrating the lens structure of an imaging lens in Example 6 of the present invention:

FIG. 7 is a cross section illustrating the lens structure of an imaging lens in Example 7 of the present invention;

FIG. 8 is a cross section illustrating the lens structure of an imaging lens in Example 8 of the present invention;

FIG. 9 is a cross section illustrating the lens structure of an imaging lens in Example 9 of the present invention;

FIG. 10 is a cross section illustrating the lens structure of an imaging lens in Example 10 of the present invention:

FIG. 11 is a cross section illustrating the lens structure of an imaging lens in Example 11 of the present invention;

FIG. 12 is a cross section illustrating the lens structure of an imaging lens in Example 12 of the present invention;

FIG. 13, Sections A through D are aberration diagrams of the imaging lens in Example 1 of the present invention:

FIG. 14, Sections A through D are aberration diagrams of the imaging lens in Example 2 of the present invention:

FIG. 15, Sections A through D are aberration diagrams of the imaging lens in Example 3 of the present invention:

FIG. 16, Sections A through D are aberration diagrams of the imaging lens in Example 4 of the present invention;

FIG. 17, Sections A through D are aberration diagrams of the imaging lens in Example 5 of the present invention;

FIG. 18, Sections A through D are aberration diagrams of the imaging lens in Example 6 of the present invention:

FIG. 19, Sections A through D are aberration diagrams of the imaging lens in Example 7 of the present invention;

FIG. 20, Sections A through D are aberration diagrams of the imaging lens in Example 8 of the present invention;

FIG. 21, Sections A through D are aberration diagrams of the imaging lens in Example 9 of the present invention;

FIG. 22, Sections A through D are aberration diagrams of the imaging lens in Example 10 of the present invention:

FIG. 23, Sections A through D are aberration diagrams of the imaging lens in Example 11 of the present invention;

FIG. 24, Sections A through D are aberration diagrams of the imaging lens in Example 12 of the present invention.

DESCRIPTION OF THE PREFERRED EMBODIMENTS

Figure 25:
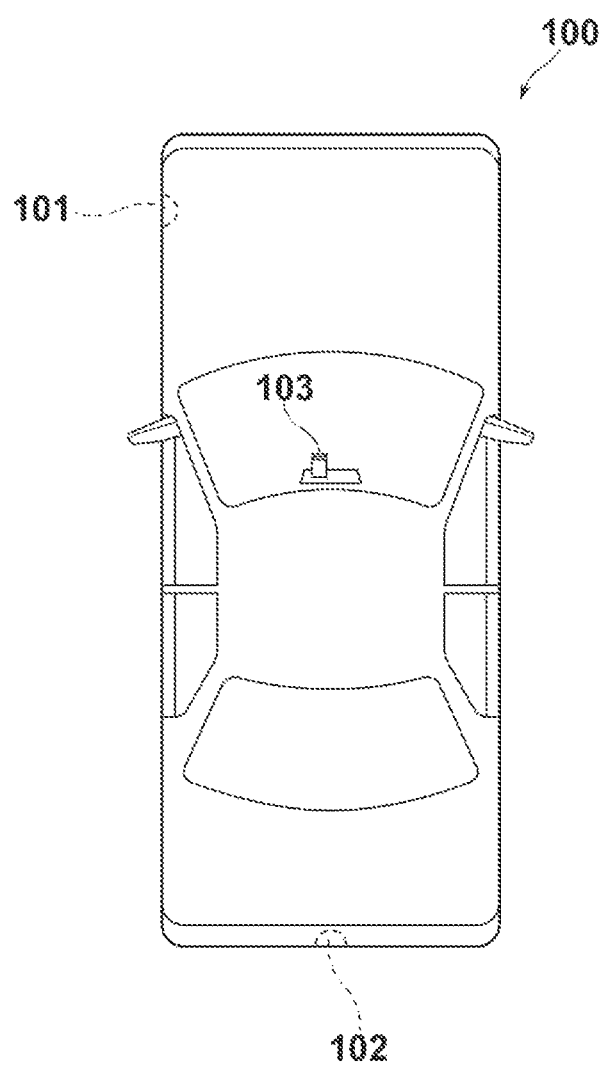
FIG. 25 is a schematic diagram illustrating the structure of an imaging apparatus according to an embodiment of the present invention.

Hereinafter, embodiments of the present invention will be described in detail with reference to drawings. FIG. 1 is a cross section illustrating the lens structure of an imaging lens according to an embodiment of the present invention. The example of structure illustrated in FIG. 1 is the same as the structure of an imaging lens in Example 1, which will be described later. In FIG. 1, the left side is an object side, and the right side is an image side. In FIG. 1, axial rays Wa and rays Wb at a maximum angle of view are also illustrated.

As illustrated in FIG. 1, this imaging lens consists of first lens L1 having negative refractive power, second lens L2 having positive refractive power, stop St, third lens L3 having negative refractive power, fourth lens L4 having positive refractive power, fifth lens L5 having positive refractive power, and sixth lens L6 having negative refractive power, along optical axis Z, from an object side.

As described above, first lens L1 and second lens L2 constitute a retrofocus system, and third lens L3 through fifth lens L5 constitute a retrofocus system. Therefore, it is possible to provide a long backfocus relative to the length of the entire system of the imaging lens.

When the imaging lens is applied to an imaging apparatus, a cover glass, a prism and various kinds of filter, such as an infrared ray cut filter and a low-pass filter, may be arranged between lenses or between the optical system and image plane Sim based on the structure of a camera on which the lens is mounted. Instead of arranging such filters, a coating having an action similar to various filters may be applied to a lens surface of one of the lenses.

Further, the imaging lens is structured in such a manner that at least one of second lens L2 through sixth lens L6 satisfies the following conditional expression (1), and that the imaging lens, as a whole, satisfies the following conditional expression (2):

$$(1/\tau i) \times (f/fi) < 0 \qquad (1); \text{ and}$$

$$\Sigma(1/\tau i) \times (f/fi) < 0 \ (i=1 \text{ through } 6) \qquad (2), \text{ where}$$

τi: a thermal Abbe number of an i-th lens,
f: a focal length of an entire system, and
fi: a focal length of the i-th lens.

Meanwhile, a relationship between a thermal Abbe number and a temperature coefficient of a refractive index is represented by the following equation (A):

$$1/\tau i = dni/dt/(ni-1) - \alpha i \qquad (A), \text{ where}$$

dni/dt: a temperature coefficient of a refractive index of the i-th lens from 20 degrees to 40 degrees,
ni: a refractive index of the i-th lens for d-line, and
αi: a coefficient of linear expansion of the i-th lens.

It is desirable that a lens used in environment with a large fluctuation of temperature is a glass lens when the durability of the lens is taken into consideration. However, temperature coefficients of the refractive indices of many kinds of glass are positive values. Therefore, the refractive power of an imaging lens having positive refractive power, as a whole, becomes stronger as temperature rises, and a focus position moves closer to the lens. Therefore, defocusing occurs in a lens without a focusing mechanism when temperature becomes high, and image formation performance deteriorates.

To correct such movement of a focus position due to a change in temperature, it is necessary that the temperature coefficient of the refractive index of a lens having positive refractive power is a negative value with a large absolute value, or that the temperature coefficient of the refractive index of a lens having negative refractive power is a positive value with a large absolute value.

Further, a movement amount of a focus position depends on the refractive power of a lens, and a fluctuation amount becomes larger as the refractive power is stronger. Therefore, it is desirable that the refractive power of a lens for correction is strong.

Specifically, in a lens for correcting movement of a focus position due to a change in temperature, it is desirable that a value obtained by multiplying an inverse number of thermal Abbe number τ representing a change in the focal length of a lens due to heat and the refractive power of each lens with respect to the refractive power of the whole lens is a negative value with a large absolute value. If the refractive power of first lens L1 becomes strong, correction of distortion and a coma aberration becomes difficult. Therefore, it is desirable that the refractive power of first lens L1 is weak. Hence, first lens L1 is not appropriate as a lens for compensating a change in temperature.

Therefore, when at least one of second lens L2 through sixth lens L6 satisfies at least the following conditional expression (1), and further the following conditional expression (1-1), and more desirably the following conditional expression (1-2), more excellent characteristics are achievable.

$$(1/\tau i) \times (f/fi) < 0 \quad (1);$$

$$(1/\tau i) \times (f/fi) < -5e-6 \quad (1\text{-}1); \text{ and}$$

$$(1/\tau i) \times (f/fi) < -10e-6 \quad (1\text{-}2).$$

Here, it is desirable that the refractive power of sixth lens L6 is not too strong to suppress an angle of incidence to image plane Sim. Therefore, it is more desirable that the lens for compensating a change in temperature is one of second lens L2 through fifth lens L5, or plural lenses thereof.

Further, when the whole lens also satisfies at least the following conditional expression (2), and further the following conditional expression (2-1), and more desirably the following conditional expression (2-2), more excellent characteristics are achievable.

$$\Sigma(1/\tau i) \times (f/fi) < 0 \ (i=1 \text{ through } 6) \quad (2):$$

$$\Sigma(1/\tau i) \times (f/fi) < -5e-6 \ (i=1 \text{ through } 6) \quad (2\text{-}1);$$

$$\Sigma(1/\tau i) \times (f/fi) < -10e-6 \ (i=1 \text{ through } 6) \quad (2\text{-}2).$$

In the imaging lens according to an embodiment of the present invention, it is desirable that first lens L1 has a meniscus shape with its convex surface facing the object side. Further, it is desirable that second lens L2 has a convex surface facing the object side. Further, it is desirable that third lens L3 has a concave surface facing the object side. Further, it is desirable that fourth lens L4 has an convex surface facing the image side. Further, it is desirable that fifth lens L5 has a convex surface facing the object side. Further, it is desirable that sixth lens L6 has a concave surface facing the object side.

When a concave surface of first lens L1, which is closest to the object side, faces the image side and a concave surface of sixth lens L6, which is closest to the image side, faces the object side, as described above, it is possible to suppress generation of curvature of field and distortion. Further, when second lens L2 has a convex surface facing the object side, it is possible to excellently correct curvature of field. When third lens L3 has a concave surface facing the object side, it is possible to excellently correct curvature of field and a longitudinal chromatic aberration. When fourth lens IA has a convex surface facing the image side, it is possible to excellently correct curvature of field and a coma aberration. When fifth lens L5 has a convex surface facing the object side, it is possible to correct a coma aberration while suppressing generation of a longitudinal chromatic aberration and a lateral chromatic aberration.

It is desirable that all of the first lens through the sixth lens are glass lenses.

When the imaging lens according to the embodiment of the present invention is used in tough environment, it is desirable that a multilayer coating for protection is applied to the imaging lens. Further, an anti-reflection coating for reducing ghost light or the like during usage may be applied in addition to the coating for protection.

Next, numerical value examples of the imaging lens of the present invention will be described.

First, an imaging lens in Example 1 will be described. FIG. 1 is a cross section illustrating the lens structure of the imaging lens in Example 1. In FIG. 1 and in FIGS. 2 through 12 corresponding to Examples 2 through 12, which will be described later, the left side is the object side and the right side is the image side. Illustrated stop St does not necessarily represent the size nor the shape of stop St, but the position of stop St on optical axis Z. Each of the examples is an imaging lens used in a visible through near-infrared range including blue, unless specifically mentioned.

Table 1 shows basic lens data of the imaging lens in Example 1. Table 2 shows data about aspherical surface coefficients of the imaging lens in Example 1. Table 3 shows data about expressions regarding the imaging lens in Example 1. Next, the meanings of signs in the tables will be described by using Example 1, as an example. The meanings of signs in Examples 2 through 12 are basically similar to those of Example 1.

In the lens data of Table 1, a column of surface numbers shows surface numbers when the most object-side surface of composition elements is the first surface, and the surface numbers sequentially increase toward the image side. A column of curvature radii shows the curvature radius of each surface. A column of surface distances shows a distance on optical axis Z between each surface and a surface next to the surface. Further, a column of "n" shows the refractive index of each optical element for d-line (wavelength is 587.6 nm). A column of "v" shows the Abbe number of each optical element for d-line (wavelength is 587.6 nm). A column of glass material names shows the name of glass material of each optical element. A column of "dn/dt" shows the temperature coefficient of the refractive index of each optical element from 20 degrees to 40 degrees. A column of "α" shows a coefficient of linear expansion of each optical element. In Table 1, "e-6" is omitted in the value of "dn/dt", and "e-7" is omitted in the value of "α".

The sign of a curvature radius is positive when the shape of a surface is convex toward the object side, and negative when the shape of a surface is convex toward the image side. Basic lens data show data including stop St. In the column of surface numbers, the term (STOP) is written for a surface corresponding to stop St together with a surface number.

The lens data in Table 1 show a numerical value of a paraxial curvature radius for an aspheric lens. The data about aspherical surface coefficient in Table 2 show surface numbers of aspherical surfaces and aspherical surface coefficients about the aspherical surfaces. The aspherical surface coefficients are values of coefficients KA, RBm (m=3, 4, 5, . . . 10) in an aspherical surface equation represented by the following equation (B):

$$Zd = C \cdot h^2 / (\{1 + (1 - KA \cdot C^2 \cdot h^2)^{1/2}\} + \Sigma RBm \cdot h^m) \quad (B)$$

where

Zd: a depth of an aspherical surface (the length of a perpendicular from a point on the aspherical surface at height h to a flat plane that contacts with the vertex of the aspherical surface and is perpendicular to an optical axis), h: height (a length from the optical axis), C: an inverse number of a paraxial curvature radius, and KA, RBm: aspherical surface coefficients (m=3, 4, 5, . . . 10).

The data about expressions in Table 3 show focal length f of an entire system, focal length fi of each lens, the value of $1/\tau i$ of each lens, the value of $(1/\tau i) \times (f/fi)$ of each lens, and the value of $\Sigma (1/\tau i) \times (f/fi)$ of the entire system (here, i=1 through 6). In Table 3, "e-6" is omitted in the value of $(1/\tau i) \times (f/fi)$ and the value of $(1/\tau i) \times (f/fi)$.

In the basic lens data and the data about expressions, degree is used as the unit of an angle, and "mm" is used as the unit of length. However, since an optical system is usable by proportionally enlarging or proportionally reducing its size, other appropriate units may be used.

TABLE 1

EXAMPLE 1·LENS DATA (n, ν FOR d-LINE)

| SURFACE NUMBER | CURVATURE RADIUS | SURFACE DISTANCE | n | ν | GLASS MATERIAL NAME | dn/dt(rel) | α |
|---|---|---|---|---|---|---|---|
| 1 | 7.7773 | 1.72 | 1.51680 | 64.2 | BSO7 | 2.7 | 76 |
| 2 | 4.5935 | 1.82 | | | | | |
| 3 | 6.1326 | 2.51 | 1.59201 | 67.0 | M-POD51 | −0.7 | 93 |
| 4 | −18.1280 | 0.22 | | | | | |
| 5(STOP) | 0 | 1.93 | | | | | |
| 6 | −18.2093 | 0.75 | 1.68893 | 31.1 | S-TIM28 | 2.6 | 82 |
| 7 | 5.7297 | 1.11 | | | | | |
| 8 | 39.9275 | 2.95 | 1.59201 | 57.0 | M-POD51 | −0.7 | 93 |
| 9 | −7.1612 | 0.18 | | | | | |
| 10 | 7.7689 | 2.44 | 1.88300 | 40.8 | S-LAH58 | 4.9 | 66 |
| 11 | −73.3837 | 1.03 | | | | | |
| 12 | −8.0982 | 0.88 | 1.80518 | 25.4 | S-TIH6 | 1.2 | 89 |
| 13 | 0 | 3.70 | | | | | |

TABLE 2

EXAMPLE 1·ASPHERICAL SURFACE COEFFICIENT

| SURF | KA | RB3 | RB4 | RB5 | RB6 |
|---|---|---|---|---|---|
| 3 | 2.6870566 | −2.8074117E−04 | 9.6420819E−04 | −1.7208994E−04 | −3.4717313E−03 |
| 4 | 8.3206341 | −2.2850769E−03 | 3.9573335E−03 | 1.0374983E−03 | −4.5621582E−03 |
| 8 | −10.0000000 | −5.5467889E−03 | 8.0825319E−03 | −3.2481687E−03 | −2.8146906E−04 |
| 9 | −8.9894811 | −2.6395157E−03 | −6.8791095E−04 | −7.6347843E−04 | −7.4918278E−04 |

| SURF | RB7 | RB8 | RB9 | RB10 |
|---|---|---|---|---|
| 3 | 3.9182835E−03 | −1.8684657E−03 | 4.2031828E−04 | −3.6955448E−05 |
| 4 | 3.7234373E−03 | −1.4197649E−03 | 2.6482129E−04 | −1.9068712E−05 |
| 8 | 1.2791656E−03 | −6.9463643E−04 | 1.6518466E−04 | −1.5622223E−05 |
| 9 | 1.1367071E−03 | −5.3862084E−04 | 1.1554862E−04 | −9.7730725E−06 |

TABLE 3

EXAMPLE 1·DATA ABOUT EXPRESSION

| | | | | | |
|---|---|---|---|---|---|
| f | 10.313 | | | | |
| f1 | −26.526 | 1/τ1 | −2.38 | 1/τ1 * f/f1 | 0.92 |
| f2 | 8.035 | 1/τ2 | −10.48 | 1/τ2 * f/f2 | −13.45 |
| f3 | −6.199 | 1/τ3 | −4.43 | 1/τ3 * f/f3 | 7.36 |
| f4 | 10.465 | 1/τ4 | −10.48 | 1/τ4 * f/f4 | −10.33 |
| f5 | 8.023 | 1/τ5 | −1.05 | 1/τ5 * f/f5 | −1.35 |
| f6 | −9.965 | 1/τ6 | −7.41 | 1/τ6 * f/f6 | 7.67 |
| | | | | Σ1/τi * f/fi | −9.18 |
| | | e-6 OMITTED | | | e-6 OMITTED |

FIG. 13, Sections A through D are aberration diagrams of the imaging lens in Example 1. FIG. 13, Sections A through D illustrate a spherical aberration, astigmatism, distortion and a lateral chromatic aberration, respectively.

The aberration diagrams of the spherical aberration, astigmatism and distortion illustrate aberrations when e-line (wavelength is 546.1 nm) is a reference wavelength. The spherical aberration diagram illustrates aberrations for e-line (wavelength 546.1 nm), g-line (wavelength is 435.8 nm), C-line (wavelength 656.3 nm) and A'-line (wavelength is 768.2 nm) by a solid line, a dotted line, a dot-dashed line and a two-dot-dashed line, respectively. The aberration diagram of astigmatism illustrates an aberration in a sagittal direction and an aberration in a tangential direction by a solid line and a dotted line, respectively. The lateral chromatic aberration diagram illustrates aberrations for g-line (wavelength is 435.8 nm), C-line (wavelength 656.3 nm) and A'-line (wavelength is 768.2 nm) by a dotted line, a dot-dashed line and a two-dot-dashed line, respectively. In the spherical aberration diagram, Fno. represents an F-number, and in the other aberration diagrams, ω represents a half angle of view.

Next, an imaging lens in Example 2 will be described. FIG. 2 is a cross section illustrating the lens structure of the imaging lens in Example 2. Table 4 shows basic lens data of the imaging lens in Example 2. Table 5 shows data about aspherical surface coefficients of the imaging lens in Example 2. Table 6 shows data about expressions regarding the imaging lens in Example 2. FIG. 14. Sections A through D are aberration diagrams of the imaging lens in Example 2.

TABLE 6

EXAMPLE 2·DATA ABOUT EXPRESSION

| f | 10.213 | | | | |
|---|---|---|---|---|---|
| f1 | −28.646 | 1/τ1 | −5.52 | 1/τ1 * f/f1 | 1.97 |
| f2 | 8.404 | 1/τ2 | −15.45 | 1/τ2 * f/f2 | −18.77 |
| f3 | −6.061 | 1/τ3 | −4.56 | 1/τ3 * f/f3 | 7.68 |
| f4 | 9.394 | 1/τ4 | −15.45 | 1/τ4 * f/f4 | −16.79 |
| f5 | 8.531 | 1/τ5 | −1.05 | 1/τ5 * f/f5 | −1.26 |
| f6 | −10.899 | 1/τ6 | −5.72 | 1/τ6 * f/f6 | 5.36 |
| | | | | Σ1/τi * f/fi | −21.82 |
| | | e-6 OMITTED | | | e-6 OMITTED |

Next, an imaging lens in Example 3 will be described. FIG. 3 is a cross section illustrating the lens structure of the imaging lens in Example 3. Table 7 shows basic lens data of the imaging lens in Example 3. Table 8 shows data about aspherical surface coefficients of the imaging lens in Example 3. Table 9 shows data about expressions regarding the imaging lens in Example 3. FIG. 15, Sections A through D are aberration diagrams of the imaging lens in Example 3.

TABLE 4

EXAMPLE 2·LENS DATA (n, ν FOR d-LINE)

| SURFACE NUMBER | CURVATURE RADIUS | SURFACE DISTANCE | n | ν | GLASS MATERIAL NAME | dn/dt(rel) | α |
|---|---|---|---|---|---|---|---|
| 1 | 7.699 | 1.73 | 1.52249 | 59.8 | S-NSL5 | 1.4 | 82 |
| 2 | 4.6972 | 1.88 | | | | | |
| 3 | 6.3847 | 2.64 | 1.61881 | 63.9 | M-POD4 | −3.0 | 106 |
| 4 | −24.0718 | 0.17 | | | | | |
| 5(STOP) | 0 | 2.14 | | | | | |
| 6 | −18.2051 | 0.74 | 1.72151 | 29.2 | S-TIH18 | 2.7 | 83 |
| 7 | 5.9166 | 1.05 | | | | | |
| 8 | 39.8805 | 2.61 | 1.61881 | 63.9 | S-POD4 | −3.0 | 106 |
| 9 | −6.688 | 0.15 | | | | | |
| 10 | 7.5771 | 2.44 | 1.88300 | 40.8 | E-LAH58 | 4.9 | 66 |
| 11 | 0 | 0.93 | | | | | |
| 12 | −8.1245 | 0.89 | 1.75520 | 27.5 | S-TIH4 | 2.1 | 85 |
| 13 | −398.5525 | 3.70 | | | | | |

TABLE 5

EXAMPLE 2·ASPHERICAL SURFACE COEFFICIENT

| SURF | KA | RB3 | RB4 | RB5 | RB6 |
|---|---|---|---|---|---|
| 3 | 2.9102463 | −2.1914583E−04 | 7.3352581E−04 | 3.7684529E−05 | −3.2947224E−03 |
| 4 | 9.9999974 | −1.8024514E−03 | 3.3419726E−03 | 1.1108412E−03 | −4.3927873E−03 |
| 8 | −9.4492433 | −5.1237713E−03 | 7.9092428E−03 | −3.2226231E−03 | −2.4303199E−04 |
| 9 | −5.9721359 | −2.5566316E−03 | −5.3252898E−04 | −2.6443861E−04 | −7.9684330E−04 |

| SURF | RB7 | RB8 | RB9 | RB10 |
|---|---|---|---|---|
| 3 | 3.6310987E−03 | −1.7201516E−03 | 3.8623048E−04 | −3.3947788E−05 |
| 4 | 3.7268070E−03 | −1.4784643E−03 | 2.8639967E−04 | −2.1310627E−05 |
| 8 | 1.2137009E−03 | −6.1319611E−04 | 1.2964628E−04 | −1.0292761E−05 |
| 9 | 7.1178113E−04 | −2.4001027E−04 | 3.5978903E−05 | −2.0169631E−06 |

TABLE 7

EXAMPLE 3·LENS DATA (n, ν FOR d-LINE)

| SURFACE NUMBER | CURVATURE RADIUS | SURFACE DISTANCE | n | ν | GLASS MATERIAL NAME | dn/dt(rel) | α |
|---|---|---|---|---|---|---|---|
| 1 | 7.7030 | 1.76 | 1.62588 | 35.7 | S-TIM1 | 2.7 | 81 |
| 2 | 4.7101 | 2.15 | | | | | |
| 3 | 6.6905 | 2.41 | 1.77250 | 49.5 | M-TAF1 | 8.7 | 76 |
| 4 | −35.7675 | 0.15 | | | | | |
| 5(STOP) | 0 | 1.55 | | | | | |
| 6 | −15.3441 | 0.77 | 1.72151 | 29.2 | S-TIH18 | 2.7 | 83 |
| 7 | 5.8350 | 1.03 | | | | | |
| 8 | 122.1415 | 2.51 | 1.61881 | 63.9 | M-POD4 | −3.0 | 106 |
| 9 | −6.5980 | 0.15 | | | | | |
| 10 | 8.8185 | 2.46 | 1.88300 | 40.8 | S-LAH58 | 4.9 | 65 |
| 11 | −32.3933 | 1.24 | | | | | |
| 12 | −10.0973 | 0.86 | 2.00170 | 20.5 | K-PSFN2 | 14.4 | 73 |
| 13 | −113.5585 | 3.71 | | | | | |

TABLE 8

EXAMPLE 3·ASPHERICAL SURFACE COEFFICIENT

| SURF | KA | RB3 | RB4 | RB5 | RB6 |
|---|---|---|---|---|---|
| 3 | 3.2602069 | −5.3825110E−04 | 9.7212773E−04 | 8.6747828E−05 | −3.3132851E−03 |
| 4 | 9.9582305 | −1.3933199E−03 | 2.8193552E−03 | 1.1174735E−03 | −4.3084034E−03 |
| 8 | −5.4101170 | −3.5616914E−03 | 6.6529389E−03 | −3.4868046E−03 | 1.6008882E−05 |
| 9 | −0.6654636 | −1.5238099E−03 | 8.5108993E−04 | 7.8750086E−05 | −6.9406561E−04 |

| SURF | RB7 | RB8 | RB9 | RB10 |
|---|---|---|---|---|
| 3 | 3.5038182E−03 | −1.6223779E−03 | 3.6002384E−04 | −3.1509849E−05 |
| 4 | 3.7346616E−03 | −1.4927997E−03 | 2.8755615E−04 | −2.0816681E−05 |
| 8 | 1.4781722E−03 | −8.8171907E−04 | 2.1290034E−04 | −1.8827144E−05 |
| 9 | 2.3130092E−04 | 5.1002801E−05 | −3.7804312E−05 | 5.1351902E−06 |

TABLE 9

EXAMPLE 3·DATA ABOUT EXPRESSION

| f | 9.684 | | | | |
|---|---|---|---|---|---|
| f1 | −24.902 | 1/τ1 | −3.79 | 1/τ1 * f/f1 | 1.47 |
| f2 | 7.446 | 1/τ2 | −2.81 | 1/τ2 * f/f2 | −3.66 |
| f3 | −5.725 | 1/τ3 | −4.56 | 1/τ3 * f/f3 | 7.71 |
| f4 | 10.157 | 1/τ4 | −15.45 | 1/τ4 * f/f4 | −14.73 |
| f5 | 8.030 | 1/τ5 | −1.05 | 1/τ5 * f/f5 | −1.27 |
| f6 | −10.985 | 1/τ6 | 7.08 | 1/τ6 * f/f6 | −6.24 |
| | | | | Σ1/τi * f/fi | −16.71 |
| | | | | e-6 OMITTED | e-6 OMITTED |

TABLE 9-continued shown combined above.

Next, an imaging lens in Example 4 will be described. FIG. 4 is a cross section illustrating the lens structure of the imaging lens in Example 4. Table 10 shows basic lens data of the imaging lens in Example 4. Table 11 shows data about aspherical surface coefficients of the imaging lens in Example 4. Table 12 shows data about expressions regarding the imaging lens in Example 4. FIG. 16, Sections A through D are aberration diagrams of the imaging lens in Example 4.

TABLE 10

EXAMPLE 4·LENS DATA (n, ν FOR d-LINE)

| SURFACE NUMBER | CURVATURE RADIUS | SURFACE DISTANCE | n | ν | GLASS MATERIAL NAME | dn/dt(rel) | α |
|---|---|---|---|---|---|---|---|
| 1 | 7.7635 | 1.72 | 1.51680 | 64.2 | BSC7 | 2.7 | 76 |
| 2 | 4.7030 | 1.94 | | | | | |
| 3 | 5.3504 | 2.70 | 1.61881 | 63.9 | M-POD4 | −3.0 | 106 |
| 4 | −22.7387 | 0.22 | | | | | |
| 5(STOP) | 0 | 1.82 | | | | | |
| 6 | −18.2449 | 0.81 | 1.75520 | 27.5 | S-TIH4 | 2.1 | 85 |
| 7 | 5.0418 | 1.23 | | | | | |
| 8 | 38.8664 | 2.55 | 1.66955 | 55.4 | K-VO78 | 1.9 | 80 |
| 9 | −5.6548 | 0.19 | | | | | |
| 10 | 7.7429 | 2.51 | 1.88300 | 40.8 | S-LAH58 | 4.9 | 65 |

TABLE 10-continued

EXAMPLE 4·LENS DATA (n, ν FOR d-LINE)

| SURFACE NUMBER | CURVATURE RADIUS | SURFACE DISTANCE | n | ν | GLASS MATERIAL NAME | dn/dt(rel) | α |
|---|---|---|---|---|---|---|---|
| 11 | −2948.7231 | 0.94 | | | | | |
| 12 | −7.3099 | 0.89 | 1.78470 | 26.3 | S-TIH23 | 1.4 | 88 |
| 13 | −418.3542 | 3.70 | | | | | |

TABLE 11

EXAMPLE 4·ASPHERICAL SURFACE COEFFICIENT

| SURF | KA | RB3 | RB4 | RB5 | RB6 |
|---|---|---|---|---|---|
| 3 | 2.9267758 | −1.7425590E−04 | 6.6077943E−04 | 1.2725694E−04 | −3.2992927E−03 |
| 4 | 10.0004191 | −1.5579809E−03 | 3.3434522E−03 | 1.3016334E−03 | −4.4164441E−03 |
| 8 | −9.7936701 | −4.5540318E−03 | 7.5895653E−03 | −3.3377314E−03 | −2.4099705E−04 |
| 9 | −5.1483086 | −2.3532979E−03 | −2.1322943E−04 | −2.9716633E−04 | −8.6530739E−04 |

| SURF | RB7 | RB8 | RB9 | RB10 |
|---|---|---|---|---|
| 3 | 3.6039458E−03 | −1.7053952E−03 | 3.8342151E−04 | −3.3780606E−05 |
| 4 | 3.6021839E−03 | −1.3578809E−03 | 2.4351789E−04 | −1.5730092E−05 |
| 8 | 1.2366423E−03 | −6.1860070E−04 | 1.2942158E−04 | −1.0205409E−05 |
| 9 | 7.2428155E−04 | −2.3814651E−04 | 3.5875725E−05 | −2.0964181E−06 |

TABLE 12

EXAMPLE 4·DATA ABOUT EXPRESSION

| f | 10.094 | | | | |
|---|---|---|---|---|---|
| f1 | −28.462 | 1/τ1 | −2.38 | 1/τ1 * f/f1 | 0.84 |
| f2 | 8.287 | 1/τ2 | −15.45 | 1/τ2 * f/f2 | −18.82 |
| f3 | −5.874 | 1/τ3 | −5.72 | 1/τ3 * f/f3 | 9.83 |
| f4 | 8.645 | 1/τ4 | −5.16 | 1/τ4 * f/f4 | −6.03 |
| f5 | 8.699 | 1/τ5 | −1.05 | 1/τ5 * f/f5 | −1.22 |

TABLE 12-continued

EXAMPLE 4·DATA ABOUT EXPRESSION

| f6 | −9.406 | 1/τ6 | −7.02 | 1/τ6 * f/f6 | 7.53 |
|---|---|---|---|---|---|
| | | | | Σ1/τi * f/fi | −7.86 |
| | | | e-6 OMITTED | | e-6 OMITTED |

Next, an imaging lens in Example 5 will be described. FIG. 5 is a cross section illustrating the lens structure of the imaging lens in Example 5. Table 13 shows basic lens data of the imaging lens in Example 5. Table 14 shows data about aspherical surface coefficients of the imaging lens in Example 5. Table 15 shows data about expressions regarding the imaging lens in Example 5. FIG. 17, Sections A through D are aberration diagrams of the imaging lens in Example 5.

TABLE 13

EXAMPLE 5·LENS DATA (n, ν FOR d-LINE)

| SURFACE NUMBER | CURVATURE RADIUS | SURFACE DISTANCE | n | ν | GLASS MATERIAL NAME | dn/dt(rel) | α |
|---|---|---|---|---|---|---|---|
| 1 | 7.8663 | 1.78 | 1.51742 | 52.4 | S-NSL35 | 2.4 | 80 |
| 2 | 4.8064 | 1.76 | | | | | |
| 3 | 5.9499 | 2.46 | 1.69400 | 56.3 | K-LAFK55 | 1.1 | 73 |
| 4 | −26.9743 | 0.18 | | | | | |
| 5(STOP) | 0 | 1.70 | | | | | |
| 6 | −18.1820 | 0.74 | 1.72825 | 28.5 | S-TIH10 | 2.8 | 80 |
| 7 | 5.9587 | 1.44 | | | | | |
| 8 | 39.9789 | 2.71 | 1.69400 | 56.3 | K-LAFK55 | 1.1 | 73 |
| 9 | −6.5567 | 0.18 | | | | | |
| 10 | 7.2308 | 2.57 | 1.61800 | 63.4 | S-FHM52 | −3.5 | 101 |
| 11 | 0 | 1.18 | | | | | |
| 12 | −7.2555 | 0.80 | 1.52004 | 36.3 | S-TIM2 | 2.8 | 81 |
| 13 | 0 | 8.70 | | | | | |

TABLE 14

EXAMPLE 5·ASPHERICAL SURFACE COEFFICIENT

| SURF | KA | RB3 | RB4 | RB5 | RB6 |
|---|---|---|---|---|---|
| 3 | 3.4750234 | −4.6679245E−04 | 9.5453074E−04 | 4.4256299E−05 | −3.5630108E−03 |
| 4 | 9.9859111 | −1.3547786E−03 | 2.6687345E−03 | 1.2214351E−03 | −4.4057346E−03 |
| 8 | 10.0056870 | −4.2758381E−03 | 6.9319489E−03 | −3.3369897E−03 | −3.3449046E−04 |
| 9 | −3.6571372 | −1.9930806E−03 | −2.5152107E−04 | −1.9958375E−04 | −7.8820426E−04 |

| SURF | RB7 | RB8 | RB9 | RB10 |
|---|---|---|---|---|
| 3 | 3.7754540E−03 | −1.7403210E−03 | 3.8356237E−04 | −3.3392618E−05 |
| 4 | 3.7219131E−03 | −1.4764115E−03 | 2.8691928E−04 | −2.1773554E−05 |
| 8 | 1.3061102E−03 | −6.4900305E−04 | 1.3878659E−04 | −1.1390377E−05 |
| 9 | 7.0296308E−04 | −2.6831524E−04 | 4.9896169E−05 | −3.7537303E−06 |

TABLE 15

EXAMPLE 5·DATA ABOUT EXPRESSION

| | | | | |
|---|---|---|---|---|
| f | 10.295 | | | |
| f1 | −29.677 | 1/τ1 | −3.36 | 1/τ1 * f/f1 | 1.17 |
| f2 | 8.173 | 1/τ2 | −5.71 | 1/τ2 * f/f2 | −7.20 |
| f3 | −6.034 | 1/τ3 | −4.16 | 1/τ3 * f/f3 | 7.09 |
| f4 | 8.280 | 1/τ4 | −5.71 | 1/τ4 * f/f4 | −7.11 |
| f5 | 11.656 | 1/τ5 | −15.93 | 1/τ5 * f/f5 | −14.06 |
| f6 | −11.626 | 1/τ6 | −3.58 | 1/τ6 * f/f6 | 3.17 |
| | | | | Σ1/τi * f/fi | −16.94 |
| | | e-6 OMITTED | | | e-6 OMITTED |

Next, an imaging lens in Example 6 will be described. In Example 6, a blue range is not used, and the imaging lens is used in a green to near-infrared range. FIG. 6 is a cross section illustrating the lens structure of the imaging lens in Example 6. Table 16 shows basic lens data of the imaging lens in Example 6. Table 17 shows data about aspherical surface coefficients of the imaging lens in Example 6. Table 18 shows data about expressions regarding the imaging lens in Example 6. FIG. 18, Sections A through D are aberration diagrams of the imaging lens in Example 6.

TABLE 16

EXAMPLE 6·LENS DATA (n, ν FOR d-LINE)

| SURFACE NUMBER | CURVATURE RADIUS | SURFACE DISTANCE | n | ν | GLASS MATERIAL NAME | dn/dt(rel) | α |
|---|---|---|---|---|---|---|---|
| 1 | 10.9270 | 1.61 | | | S-BAL35 | 3.8 | 57 |
| 2 | 4.7883 | 2.34 | | | | | |
| 3 | 7.2369 | 2.50 | 1.85060 | 41.6 | K-VO99 | 6.8 | 60 |
| 4 | −84.6258 | 1.49 | | | | | |
| 5(STOP) | 0 | 1.45 | | | | | |
| 6 | −4.6362 | 0.70 | 2.15400 | 17.2 | K-PSFN215 | 27.7 | 86 |
| 7 | −26.2712 | 0.80 | | | | | |
| 8 | 47.6868 | 2.14 | 1.77377 | 47.2 | M-TAF401 | 6.6 | 61 |
| 9 | −6.1531 | 0.22 | | | | | |
| 10 | 8.0598 | 2.43 | 1.88300 | 40.8 | S-LAH58 | 4.9 | 56 |
| 11 | −31.7104 | 1.30 | | | | | |
| 12 | −7.2656 | 0.90 | 1.71736 | 29.5 | S-TIH1 | 4.3 | 82 |
| 13 | −1231.3327 | 3.51 | | | | | |

TABLE 17

EXAMPLE 6·ASPHERICAL SURFACE COEFFICIENT

| SURF | KA | RB3 | RB4 | RB5 | RB6 |
|---|---|---|---|---|---|
| 3 | 2.0255698 | −5.7707198E−04 | 8.7259295E−04 | −3.9327762E−04 | −6.9499378E−04 |
| 4 | −10.0000000 | −1.8070847E−03 | 2.3699887E−03 | −1.0103365E−03 | −7.1087748E−04 |
| 8 | 8.6993070 | −1.1580231E−03 | 2.2054103E−03 | −4.3144869E−04 | −4.5776063E−04 |
| 9 | 0.4430874 | −9.0741481E−04 | 1.8533671E−03 | −6.9434971E−05 | −1.3531227E−03 |

| SURF | RB7 | RB8 | RB9 | RB10 |
|---|---|---|---|---|
| 3 | 8.5389620E−04 | −3.9181367E−04 | 8.2855165E−05 | −6.7870781E−06 |
| 4 | 1.0448722E−03 | −5.1383748E−04 | 1.1685276E−04 | −1.0341914E−05 |
| 8 | 6.0752645E−04 | −2.8674919E−04 | 6.2242010E−05 | −5.1590616E−06 |
| 9 | 1.2516090E−03 | −4.8083763E−04 | 8.7121617E−05 | −6.0587480E−06 |

TABLE 18

EXAMPLE 6·DATA ABOUT EXPRESSION

| f | 7.809 | | | | |
|---|---|---|---|---|---|
| f1 | −15.968 | 1/τ1 | −9.50 | 1/τ1 * f/f1 | 4.65 |
| f2 | 7.892 | 1/τ2 | 1.41 | 1/τ2 * f/f2 | 1.39 |
| f3 | −4.898 | 1/τ3 | 15.40 | 1/τ3 * f/f3 | −24.55 |
| f4 | 7.132 | 1/τ4 | 2.43 | 1/τ4 * f/f4 | 2.66 |
| f5 | 7.450 | 1/τ5 | −1.05 | 1/τ5 * f/f5 | −1.10 |
| f6 | −10.111 | 1/τ6 | −2.21 | 1/τ6 * f/f6 | 1.70 |
| | | | | Σ1/τi * f/fi | −15.26 |
| | | | e-6 OMITTED | | e-6 OMITTED |

Next, an imaging lens in Example 7 will be described. A blue range is not used also in Example 7, and the imaging lens is used in a green to near-infrared range. FIG. 7 is a cross section illustrating the lens structure of the imaging lens in Example 7. Table 19 shows basic lens data of the imaging lens in Example 7. Table 20 shows data about aspherical surface coefficients of the imaging lens in Example 7. Table 21 shows data about expressions regarding the imaging lens in Example 7. FIG. 19, Sections A through D are aberration diagrams of the imaging lens in Example 7.

TABLE 19

EXAMPLE 7·LENS DATA (n, ν FOR d-LINE)

| SURFACE NUMBER | CURVATURE RADIUS | SURFACE DISTANCE | n | ν | GLASS MATERIAL NAME | dn/dt(rel) | α |
|---|---|---|---|---|---|---|---|
| 1 | 8.8215 | 1.70 | 1.48749 | 70.20 | S-FSL5 | −0.7 | 90 |
| 2 | 5.6874 | 1.99 | | | | | |
| 3 | 5.9766 | 2.62 | 1.88441 | 37.28 | M-NBFD10 | 7.1 | 61 |
| 4 | 72.0497 | 0.10 | | | | | |
| 5(STOP) | 0 | 1.66 | | | | | |
| 6 | −7.7649 | 0.75 | 2.15400 | 17.20 | K-PSFN215 | 27.7 | 86 |
| 7 | 10.4288 | 1.05 | | | | | |
| 8 | 82.1513 | 2.44 | 1.78800 | 47.40 | S-LAH64 | 4.4 | 61 |
| 9 | −6.1533 | 0.20 | | | | | |
| 10 | 11.1776 | 2.53 | 1.88300 | 40.80 | S-LAH58 | 4.9 | 66 |
| 11 | −21.5066 | 1.27 | | | | | |
| 12 | −7.4004 | 0.99 | 1.54814 | 45.80 | S-TIL1 | 1.8 | 86 |
| 13 | 33.2633 | 3.70 | | | | | |

TABLE 20

EXAMPLE 7·ASPHERICAL SURFACE COEFFICIENT

| SURF | KA | RB3 | RB4 | RB5 | RB6 |
|---|---|---|---|---|---|
| 3 | 2.1252394 | −1.1195845E−03 | 1.8411581E−03 | −9.2037594E−04 | −9.5871814E−04 |
| 4 | −9.9956411 | −1.8781744E−03 | 4.4187676E−03 | −1.4866119E−03 | −1.0275320E−03 |
| 6 | 2.4496508 | −1.7152531E−03 | −3.1469481E−04 | −1.3221171E−04 | −6.1295268E−04 |
| 7 | −2.8613231 | −1.2484184E−03 | −2.9012815E−04 | −6.4327112E−04 | −2.7881716E−04 |

| SURF | RB7 | RB8 | RB9 | RB10 |
|---|---|---|---|---|
| 3 | 1.3308295E−03 | −6.3927134E−04 | 1.4132573E−04 | −1.2238915E−05 |
| 4 | 1.4165232E−03 | −6.3430044E−04 | 1.3029139E−04 | −1.0617571E−05 |
| 6 | −2.5422754E−04 | 6.0987875E−04 | −2.8657696E−04 | 4.3797617E−05 |
| 7 | 2.5682385E−04 | 2.6031538E−05 | −4.5344653E−05 | 8.2265111E−06 |

TABLE 21

EXAMPLE 7·DATA ABOUT EXPRESSION

| f | 10.064 | | | | |
|---|---|---|---|---|---|
| f1 | −39.822 | 1/τ1 | −10.44 | 1/τ1 * f/f1 | 2.64 |
| f2 | 7.623 | 1/τ2 | 2.41 | 1/τ2 * f/f2 | 3.18 |
| f3 | −3.722 | 1/τ3 | 15.40 | 1/τ3 * f/f3 | −41.65 |
| f4 | 6.710 | 1/τ4 | −0.52 | 1/τ4 * f/f4 | −0.77 |
| f5 | 8.594 | 1/τ5 | −1.05 | 1/τ5 * f/f5 | −1.23 |
| f6 | −10.893 | 1/τ6 | −5.32 | 1/τ6 * f/f6 | 4.91 |
| | | | | Σ1/τi * f/fi | −32.92 |
| | | e-6 OMITTED | | | e-6 OMITTED |

Next, an imaging lens in Example 8 will be described. FIG. 8 is a cross section illustrating the lens structure of the imaging lens in Example 8. Table 22 shows basic lens data of the imaging lens in Example 8. Table 23 shows data about aspherical surface coefficients of the imaging lens in Example 8. Table 24 shows data about expressions regarding the imaging lens in Example 8. FIG. 20, Sections A through D are aberration diagrams of the imaging lens in Example 8.

TABLE 22

EXAMPLE 8·LENS DATA (n, ν FOR d-LINE)

| SURFACE NUMBER | CURVATURE RADIUS | SURFACE NUMBER | n | ν | GLASS MATERIAL NAME | dn/dt(rel) | α |
|---|---|---|---|---|---|---|---|
| 1 | 17.3262 | 1.70 | 1.48749 | 70.20 | S-FSL5 | −0.7 | 90 |
| 2 | 5.9829 | 1.82 | | | | | |
| 3 | 6.3432 | 2.48 | 1.82090 | 42.71 | M-TAFD51 | 6.1 | 64 |
| 4 | −33.9182 | 0.20 | | | | | |
| 5(STOP) | 0 | 1.66 | | | | | |
| 6 | −7.1695 | 0.78 | 2.00170 | 20.60 | K-PSFN2 | 14.4 | 73 |
| 7 | 16.3298 | 0.98 | | | | | |
| 8 | 40.6295 | 2.51 | 1.69400 | 56.30 | K-LAFK55 | 1.1 | 73 |
| 9 | −8.9920 | 0.20 | | | | | |
| 10 | 10.2937 | 2.47 | 1.88300 | 40.80 | S-LAH58 | 4.9 | 66 |
| 11 | −19.6962 | 1.65 | | | | | |
| 12 | −7.0512 | 0.80 | 1.56732 | 42.80 | S-TIL26 | 2.8 | 79 |
| 13 | −356.0912 | 3.89 | | | | | |

TABLE 23

EXAMPLE 8·ASPHERICAL SURFACE COEFFICIENT

| SURF | KA | RB3 | RB4 | RB5 | RB6 |
|---|---|---|---|---|---|
| 3 | 1.1500054 | −3.8360860E−04 | 8.4376147E−04 | −5.1202252E−04 | −6.8070386E−04 |
| 4 | 10.0287086 | −1.3684880E−03 | 2.7447888E−03 | −1.4286606E−03 | −1.0061391E−03 |
| 8 | −5.8142099 | −1.4858321E−04 | 1.7047379E−03 | −7.2343319E−04 | −2.6595167E−04 |
| 9 | −0.0246565 | −5.8254017E−04 | 2.1750344E−03 | −5.2533781E−04 | −1.4058839E−03 |

| SURF | RB7 | RB8 | RB9 | RB10 |
|---|---|---|---|---|
| 3 | 9.4268729E−04 | −4.7718358E−04 | 1.1237317E−04 | −1.0497053E−05 |
| 4 | 1.4494234E−03 | −6.7674757E−04 | 1.4403702E−04 | −1.2100524E−05 |
| 8 | 9.0171619E−04 | −5.7592198E−04 | 1.5068459E−04 | −1.4497249E−05 |
| 9 | 1.5614806E−03 | −6.6922167E−04 | 1.3349091E−04 | −1.0322689E−05 |

TABLE 24

EXAMPLE 8·DATA ABOUT EXPRESSION

| f | 9.938 | | | | |
|---|---|---|---|---|---|
| f1 | −19.650 | 1/τ1 | −10.44 | 1/τ1 * f/f1 | 5.28 |
| f2 | 6.660 | 1/τ2 | 1.03 | 1/τ2 * f/f2 | 1.54 |
| f3 | −4.837 | 1/τ3 | 7.08 | 1/τ3 * f/f3 | −14.54 |
| f4 | 10.788 | 1/τ4 | −5.71 | 1/τ4 * f/f4 | −5.26 |
| f5 | 7.919 | 1/τ5 | −1.05 | 1/τ5 * f/f5 | −1.32 |
| f6 | −12.621 | 1/τ6 | −2.96 | 1/τ6 * f/f6 | 2.33 |
| | | | | Σ1/τi * f/fi | −11.97 |
| | | | | e-6 OMITTED | e-6 OMITTED |

Next, an imaging lens in Example 9 will be described. FIG. 9 is a cross section illustrating the lens structure of the imaging lens in Example 9. Table 25 shows basic lens data of the imaging lens in Example 9. Table 26 shows data about aspherical surface coefficients of the imaging lens in Example 9. Table 27 shows data about expressions regarding the imaging lens in Example 9. FIG. 21, Sections A through D are aberration diagrams of the imaging lens in Example 9.

TABLE 25

EXAMPLE 9·LENS DATA (n, ν FOR d-LINE)

| SURFACE NUMBER | CURVATURE RADIUS | SURFACE DISTANCE | n | ν | GLASS MATERIAL NAME | dn/dt(rel) | α |
|---|---|---|---|---|---|---|---|
| 1 | 9.3851 | 1.68 | 1.51533 | 64.10 | S-BSL7 | 2.7 | 72 |
| 2 | 5.9880 | 1.76 | | | | | |
| 3 | 5.6135 | 2.61 | 1.77200 | 50.00 | K-LAFK50 | 2.6 | 73 |
| 4 | 20.8316 | 1.18 | | | | | |
| 5(STOP) | 0 | 1.21 | | | | | |
| 6 | −4.3117 | 0.78 | 2.00170 | 20.60 | K-FSFN2 | 14.4 | 73 |
| 7 | −44.8195 | 0.96 | | | | | |
| 8 | 66.5302 | 2.43 | 1.85280 | 39.00 | K-VO90 | 3.8 | 77 |
| 9 | −6.9485 | 0.23 | | | | | |
| 10 | 8.9249 | 2.47 | 1.88300 | 40.80 | S-LAH58 | 4.9 | 65 |

TABLE 25-continued

EXAMPLE 9•LENS DATA (n, ν FOR d-LINE)

| SURFACE NUMBER | CURVATURE RADIUS | SURFACE DISTANCE | n | ν | GLASS MATERIAL NAME | dn/dt(rel) | α |
|---|---|---|---|---|---|---|---|
| 11 | 0 | 1.51 | | | | | |
| 12 | −12.3977 | 0.80 | 2.00170 | 20.60 | K-PSFN2 | 14.4 | 73 |
| 13 | −126.8756 | 3.70 | | | | | |

TABLE 26

EXAMPLE 9•ASPHERICAL SURFACE COEFFICIENT

| SURF | KA | RB3 | RB4 | RB5 | RB6 |
|---|---|---|---|---|---|
| 3 | 1.2706869 | −8.7521983E−04 | 1.4175568E−03 | −3.1621407E−04 | −9.4085139E−04 |
| 4 | −10.0000255 | −2.3406426E−03 | 2.9357956E−03 | −8.2379741E−04 | −9.8977692E−04 |
| 8 | −9.8259505 | −7.5830561E−04 | 9.7899321E−04 | −9.0812654E−04 | −2.4533839E−04 |
| 9 | 0.7816300 | −8.5668380E−04 | 2.3177694E−03 | −6.9170631E−04 | −1.5463037E−03 |

| SURF | RB7 | RB8 | RB9 | RB10 |
|---|---|---|---|---|
| 3 | 9.5480862E−04 | −3.9989108E−04 | 8.1589008E−05 | −6.7943954E−06 |
| 4 | 1.0138344E−03 | −3.8728878E−04 | 6.6131223E−05 | −4.5198470E−06 |
| 8 | 9.9964867E−04 | −6.6818755E−04 | 1.8279214E−04 | −1.8556033E−05 |
| 9 | 1.6999648E−03 | −7.2279899E−04 | 1.4352263E−04 | −1.1167138E−05 |

TABLE 27

EXAMPLE 9•DATA ABOUT EXPRESSION

| f | 10.381 | | | | |
|---|---|---|---|---|---|
| f1 | −38.403 | 1/τ1 | −1.97 | 1/τ1 * f/f1 | 0.53 |
| f2 | 9.216 | 1/τ2 | −3.93 | 1/τ2 * f/f2 | −4.43 |
| f3 | −4.755 | 1/τ3 | 7.08 | 1/τ3 * f/f3 | −15.45 |
| f4 | 7.446 | 1/τ4 | −3.24 | 1/τ4 * f/f4 | −4.52 |
| f5 | 10.049 | 1/τ5 | −1.05 | 1/τ5 * f/f5 | −1.09 |
| f6 | −13.611 | 1/τ6 | 7.08 | 1/τ6 * f/f6 | −5.40 |
| | | | | Σ1/τi * f/fi | −30.35 |
| | | | e-6 OMITTED | | e-6 OMITTED |

Next, an imaging lens in Example 10 will be described. In Example 10 and thereafter, no aspheric lens is used, and the imaging lens consists of only spherical lenses. FIG. 10 is a cross section illustrating the lens structure of the imaging lens in Example 10. Table 28 shows basic lens data of the imaging lens in Example 10. Table 29 shows data about expressions regarding the imaging lens in Example 10. FIG. 22, Sections A through D are aberration diagrams of the imaging lens in Example 10.

TABLE 28

EXAMPLE 10•LENS DATA (n, ν FOR d-LINE)

| SURFACE NUMBER | CURVATURE RADIUS | SURFACE DISTANCE | n | ν | GLASS MATERIAL NAME | dn/dt(rel) | α |
|---|---|---|---|---|---|---|---|
| 1 | 8.0733 | 1.70 | 1.56732 | 42.80 | S-TIL25 | 2.8 | 79 |
| 2 | 4.6435 | 1.80 | | | | | |
| 3 | 5.3651 | 2.80 | 1.77250 | 49.47 | M-TAF1 | 3.7 | 76 |
| 4 | −39.4732 | 0.20 | | | | | |
| 5(STOP) | 0 | 1.84 | | | | | |
| 6 | −18.1818 | 0.80 | 1.75520 | 27.50 | S-TIH4 | 2.1 | 85 |
| 7 | 5.7143 | 1.01 | | | | | |
| 8 | 39.9959 | 2.70 | 1.61881 | 63.85 | M-POD4 | −3.0 | 106 |
| 9 | −10.7983 | 0.20 | | | | | |
| 10 | 10.8633 | 2.50 | 1.88300 | 40.80 | S-LAH58 | 4.9 | 66 |
| 11 | −10.6414 | 1.25 | | | | | |
| 12 | −9.4730 | 0.90 | 2.00170 | 20.60 | K-PSFN2 | 14.4 | 73 |
| 13 | 0 | 3.68 | | | | | |

TABLE 29

EXAMPLE 10•DATA ABOUT EXPRESSION

| f  | 10.654  |      |          |            |          |
|----|---------|------|----------|------------|----------|
| f1 | −23.368 | 1/τ1 | −2.9645  | 1/τ1 * f/f1 | 1.3515   |
| f2 | 7.255   | 1/τ2 | −2.8104  | 1/τ2 * f/f2 | −4.1268  |
| f3 | −5.627  | 1/τ3 | −5.7193  | 1/τ3 * f/f3 | 10.8286  |
| f4 | 13.969  | 1/τ4 | −15.4480 | 1/τ4 * f/f4 | −11.7816 |
| f5 | 6.262   | 1/τ5 | −1.0507  | 1/τ5 * f/f5 | −1.7876  |

TABLE 29-continued

EXAMPLE 10•DATA ABOUT EXPRESSION

| f6 | −9.351 | 1/τ6 | 7.0756 | 1/τ6 * f/f6 | −8.0616 |
|----|--------|------|--------|-------------|---------|
|    |        |      |        | Σ1/τi * f/fi | −13.5774 |
|    |        | e-6 OMITTED |  |        | e-6 OMITTED |

Next, an imaging lens in Example 11 will be described. FIG. 11 is a cross section illustrating the lens structure of the imaging lens in Example 11. Table 30 shows basic lens data of the imaging lens in Example 11. Table 31 shows data about expressions regarding the imaging lens in Example 11. FIG. 23, Sections A through D are aberration diagrams of the imaging lens in Example 11.

TABLE 30

EXAMPLE 11•LENS DATA (n, ν FOR d-LINE)

| SURFACE NUMBER | CURVATURE RADIUS | SURFACE DISTANCE | n       | ν     | GLASS MATERIAL NAME | dn/dt(rel) | α  |
|----------------|------------------|------------------|---------|-------|---------------------|------------|----|
| 1              | 10.6592          | 1.70             | 1.48749 | 70.20 | S-FSL5              | −0.7       | 90 |
| 2              | 4.6471           | 1.80             |         |       |                     |            |    |
| 3              | 6.8438           | 2.80             | 1.82080 | 42.71 | M-TAFD51            | 6.1        | 64 |
| 4              | −27.5405         | 0.22             |         |       |                     |            |    |
| 5(STOP)        | 0                | 1.52             |         |       |                     |            |    |
| 6              | −9.4644          | 0.80             | 2.00170 | 20.60 | K-PSFN2             | 14.4       | 73 |
| 7              | 11.6837          | 0.60             |         |       |                     |            |    |
| 8              | −14.6632         | 2.50             | 1.88300 | 40.80 | S-LAH58             | 4.9        | 66 |
| 9              | −6.0601          | 0.20             |         |       |                     |            |    |
| 10             | 10.7808          | 2.50             | 1.88300 | 40.80 | S-LAH58             | 4.9        | 66 |
| 11             | −9.2946          | 0.00             |         |       |                     |            |    |
| 12             | −9.2946          | 0.80             | 1.74077 | 27.80 | S-TIH13             | 2.5        | 83 |
| 13             | 63.1864          | 5.95             |         |       |                     |            |    |

TABLE 31

EXAMPLE 11•DATA ABOUT EXPRESSION

| f  | 8.632   |      |          |             |         |
|----|---------|------|----------|-------------|---------|
| f1 | −18.569 | 1/τ1 | −10.4359 | 1/τ1 * f/f1 | 4.8513  |
| f2 | 6.895   | 1/τ2 | 1.0318   | 1/τ2 * f/f2 | 1.2916  |
| f3 | −5.065  | 1/τ3 | 7.0756   | 1/τ3 * f/f3 | 12.0589 |
| f4 | 10.231  | 1/τ4 | −1.0507  | 1/τ4 * f/f4 | −0.8865 |
| f5 | 5.970   | 1/τ5 | −1.0507  | 1/τ5 * f/f5 | −1.5193 |
| f6 | −10.795 | 1/τ6 | −4.9251  | 1/τ6 * f/f6 | 3.9382  |
|    |         |      |          | Σ1/τi * f/fi | −4.3836 |
|    |         | e-6 OMITTED |   |             | e-6 OMITTED |

Next, an imaging lens in Example 12 will be described. FIG. 12 is a cross section illustrating the lens structure of the imaging lens in Example 12. Table 32 shows basic lens data of the imaging lens in Example 12. Table 33 shows data about expressions regarding the imaging lens in Example 12. FIG. 24, Sections A through D are aberration diagrams of the imaging lens in Example 12.

TABLE 32

EXAMPLE 12•LENS DATA (n, ν FOR d-LINE)

| SURFACE NUMBER | CURVATURE RADIUS | SURFACE DISTANCE | n       | ν     | GLASS MATERIAL NAME | dn/dt(rel) | α  |
|----------------|------------------|------------------|---------|-------|---------------------|------------|----|
| 1              | 8.2603           | 1.70             | 1.51823 | 59.00 | S-NSL3              | 0.7        | 90 |
| 2              | 5.5690           | 1.80             |         |       |                     |            |    |
| 3              | 7.1454           | 2.80             | 1.77200 | 50.00 | K-LAFK50            | 2.6        | 73 |
| 4              | −49.7978         | 0.20             |         |       |                     |            |    |
| 5(STOP)        | 0                | 1.94             |         |       |                     |            |    |
| 6              | −5.4230          | 0.80             | 2.00170 | 20.60 | K-PSFN2             | 14.4       | 73 |
| 7              | 12.2435          | 0.94             |         |       |                     |            |    |

TABLE 32-continued

EXAMPLE 12•LENS DATA (n, ν FOR d-LINE)

| SURFACE NUMBER | CURVATURE RADIUS | SURFACE DISTANCE | n | ν | GLASS MATERIAL NAME | dn/dt(rel) | α |
|---|---|---|---|---|---|---|---|
| 8 | 83.3288 | 2.50 | 1.85026 | 32.30 | S-LAH71 | 3.6 | 77 |
| 9 | −5.6765 | 0.20 | | | | | |
| 10 | 10.8625 | 2.50 | 1.83481 | 42.70 | S-LAH55V | 4.5 | 62 |
| 11 | −15.3076 | 1.54 | | | | | |
| 12 | −10.0314 | 0.80 | 2.00170 | 20.60 | K-PSFN2 | 14.4 | 73 |
| 13 | 0 | 3.70 | | | | | |

TABLE 33

EXAMPLE 12•DATA ABOUT EXPRESSION

| f | 10.169 | | | | |
|---|---|---|---|---|---|
| f1 | −41.912 | 1/τ1 | −7.6492 | 1/τ1 * f/f1 | 1.8559 |
| f2 | 8.233 | 1/τ2 | −3.9321 | 1/τ2 * f/f2 | −4.8568 |
| f3 | −4.071 | 1/τ3 | 7.0756 | 1/τ3 * f/f3 | −17.6753 |
| f4 | 7.311 | 1/τ4 | −3.4660 | 1/τ4 * f/f4 | −4.8211 |
| f5 | 7.914 | 1/τ5 | −0.8096 | 1/τ5 * f/f5 | −1.0402 |
| f6 | −9.902 | 1/τ6 | 7.0756 | 1/τ6 * f/f6 | −7.2664 |
| | | | | Σ1/τi * f/fi | −33.8039 |
| | | | e-6 OMITTED | | e-6 OMITTED |

As the above data show, all of the imaging lenses in Examples 1 through 12 satisfy conditional expressions (1) and (2). In all of the imaging lenses, F-numbers are 1.6 through 2.0, and full angles of view are about 30 through 40 degrees. Further, the imaging lenses are compact, and have long backfocus. The imaging lenses have excellent performance at normal temperature and also at high temperature, and a change in the focus position of which is small when temperature changes.

FIG. 25 is a diagram illustrating a manner of installing an imaging apparatus including an imaging lens according to an embodiment of the present embodiment in a car 100. In FIG. 25, the car 100 includes an exterior camera 101 for imaging a driver's blind spot on a side of a seat next to the driver, an exterior camera 102 for imaging a driver's blind spot on a rear side of the car 100, and an interior camera 103 for imaging the same range as the driver's visual field. The interior camera 103 is attached to the back side of a rearview mirror. The exterior cameras 101 and 102 and the interior camera 103 are imaging apparatuses according to an embodiment of the present invention. The imaging apparatus includes an imaging lens according to an embodiment of the present invention and an imaging device for converting an optical image formed by the imaging lens into electrical signals.

So far, the present invention has been described by using embodiments and examples. However, the present invention is not limited to the aforementioned embodiments nor examples, and various modifications are possible. For example, values of a curvature radius, a distance between surfaces, a refractive index, an Abbe number, and the like of each lens element are not limited to the values in the aforementioned examples of numerical values, but may be other values.

In the embodiment of the imaging apparatus, the present invention was described by using an on-vehicle camera installed in a four-wheeled vehicle, as an example. However, application of the present invention is not limited to this purpose. For example, the present invention may be applied to an on-vehicle camera for a two-wheeled vehicle, a camera for a mobile terminal, a surveillance camera, and the like.

What is claimed is:

1. An imaging lens substantially consisting of:
 a first lens having negative refractive power;
 a second lens having positive refractive power;
 a third lens having negative refractive power;
 a fourth lens having positive refractive power;
 a fifth lens having positive refractive power; and
 a sixth lens having negative refractive power in this order from an object side,
 wherein at least one of the second lens through the sixth lens satisfies the following conditional expression (1), and the imaging lens, as a whole, satisfies the following conditional expression (2):

$$(1/\tau i) \times (f/fi) < 0 \qquad (1); \text{ and}$$

$$\Sigma(1/\tau i) \times (f/fi) < 0 \ (i=1 \text{ through } 6) \qquad (2), \text{ where}$$

τi: a thermal Abbe number of an i-th lens,
f: a focal length of an entire system, and
fi: a focal length of the i-th lens.

2. The imaging lens, as defined in claim 1, wherein the first lens has a meniscus shape with its convex surface facing the object side.

3. The imaging lens, as defined in claim 1, wherein the sixth lens has a concave surface facing the object side.

4. The imaging lens, as defined in claim 1, wherein the fourth lens has a convex surface facing an image side.

5. The imaging lens, as defined in claim 1, wherein the fifth lens has a convex surface facing the object side.

6. The imaging lens, as defined in claim 1, wherein the second lens has a convex surface facing the object side.

7. The imaging lens, as defined in claim 1, wherein the third lens has a concave surface facing the object side.

8. The imaging lens, as defined in claim 1, wherein all of the first lens through the sixth lens are glass lenses.

9. The imaging lens, as defined in claim 1, wherein at least one of the second lens through the sixth lens satisfies the following conditional expression (1-1):

$$(1/\tau i) \times (f/fi) < -5e-6 \qquad (1\text{-}1).$$

10. The imaging lens, as defined in claim 9, wherein at least one of the second lens through the fifth lens satisfies the conditional expression (1-1).

11. The imaging lens, as defined in claim 1, wherein at least one of the second lens through the sixth lens satisfies the following conditional expression (1-2):

$$(1/\tau i) \times (f/fi) < -10e-6 \qquad (1\text{-}2).$$

12. The imaging lens, as defined in claim 11, wherein at least one of the second lens through the fifth lens satisfies the conditional expression (1-2).

13. The imaging lens, as defined in claim 1, wherein the following conditional expression (2-1) is satisfied:

$$\Sigma(1/\tau i) \times (f/fi) < -5e-6 \ (i=1 \text{ through } 6) \qquad (2\text{-}1).$$

14. The imaging lens, as defined in claim 1, wherein the following conditional expression (2-2) is satisfied:

$$\Sigma(1/\tau i) \times (f/fi) < -10e-6 \ (i=1 \text{ through } 6) \qquad (2\text{-}2).$$

15. An imaging apparatus comprising the imaging lens, as defined in claim 1.

* * * * *